(12) United States Patent
Keogh et al.

(10) Patent No.: US 10,577,875 B2
(45) Date of Patent: Mar. 3, 2020

(54) PIPE STAND TRANSFER SYSTEM

(71) Applicant: NATIONAL OILWELL VARCO, L.P., Houston, TX (US)

(72) Inventors: Gregory Keogh, Houston, TX (US); Ronald W. Yater, Houston, TX (US); Dylan Rigby, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 24 days.

(21) Appl. No.: 15/757,612

(22) PCT Filed: Aug. 11, 2016

(86) PCT No.: PCT/US2016/046481
§ 371 (c)(1),
(2) Date: Mar. 5, 2018

(87) PCT Pub. No.: WO2017/039996
PCT Pub. Date: Mar. 9, 2017

(65) Prior Publication Data
US 2018/0245408 A1    Aug. 30, 2018

Related U.S. Application Data

(60) Provisional application No. 62/214,084, filed on Sep. 3, 2015.

(51) Int. Cl.
*E21B 15/00* (2006.01)
*E21B 19/14* (2006.01)
(Continued)

(52) U.S. Cl.
CPC .............. *E21B 19/14* (2013.01); *B25J 9/045* (2013.01); *B25J 9/1065* (2013.01); *B25J 18/025* (2013.01); *E21B 15/00* (2013.01); *E21B 19/24* (2013.01)

(58) Field of Classification Search
CPC ........ E21B 19/14; E21B 9/045; E21B 9/1065; E21B 19/24
See application file for complete search history.

(56) References Cited

U.S. PATENT DOCUMENTS

| 5,410,944 A | 5/1995 | Cushman |
| 2007/0114069 A1 | 5/2007 | Hooper |

(Continued)

OTHER PUBLICATIONS

International Search Report and Written Opinion dated Nov. 18, 2016 for Application No. PCT/US2016/046481.

*Primary Examiner* — Giovanna C Wright
*Assistant Examiner* — Brandon M Duck
(74) *Attorney, Agent, or Firm* — Conley Rose, P.C.

(57) ABSTRACT

A pipe handler for handling tubular members of a well system includes a mounting member for mounting the pipe handler to a structure of the well system, a first arm having a first end coupled to a structure of the well system, and a second end, wherein the first arm is configured to pivot relative to the mounting member about a first axis, a second arm having a first end and a second end, a connector coupled to the second end of the first arm and the first end of the second arm, and wherein the connector is configured to rotate the second arm about a second axis and a guide member coupled to the second end of the second arm for guiding a tubular member, wherein the second arm is configured to pivot relative to the connector about a third axis.

18 Claims, 21 Drawing Sheets

(51) Int. Cl.
 *E21B 19/24* (2006.01)
 *B25J 9/10* (2006.01)
 *B25J 9/04* (2006.01)
 *B25J 18/02* (2006.01)

(56) References Cited

U.S. PATENT DOCUMENTS

| | | |
|---|---|---|
| 2007/0140823 A1 | 6/2007 | Dorner |
| 2010/0303586 A1 | 12/2010 | Hankins |
| 2011/0103922 A1 | 5/2011 | Belik |
| 2016/0102508 A1 | 4/2016 | Fox et al. |
| 2016/0115751 A1* | 4/2016 | Jelgert ...................... E21B 7/02 166/380 |

* cited by examiner

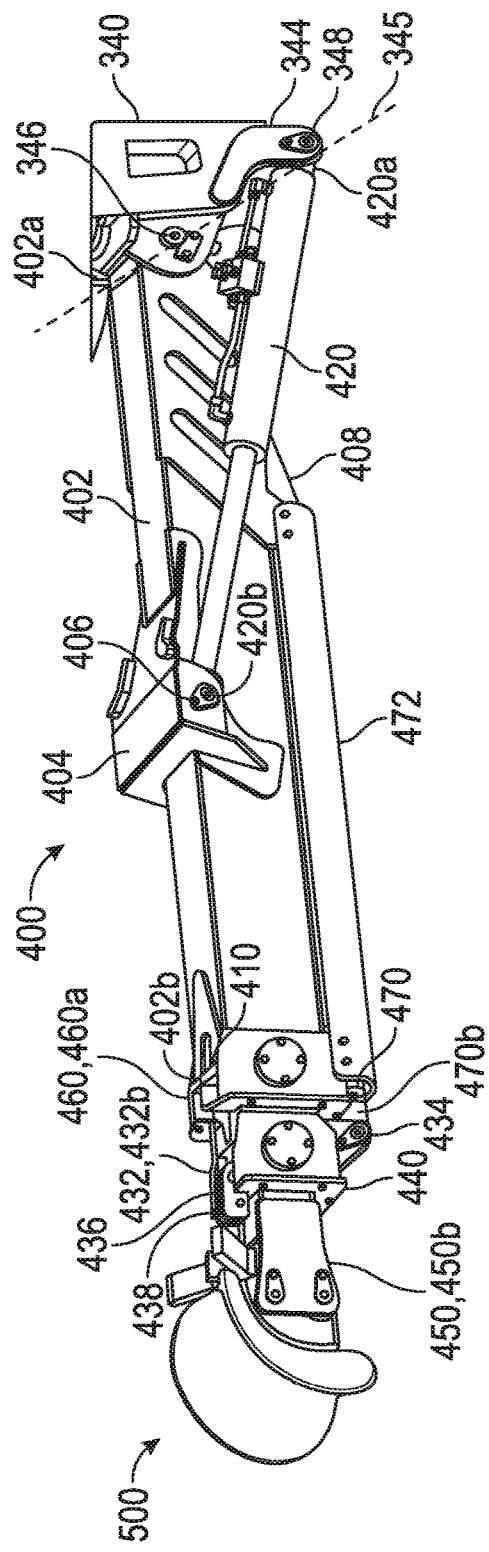
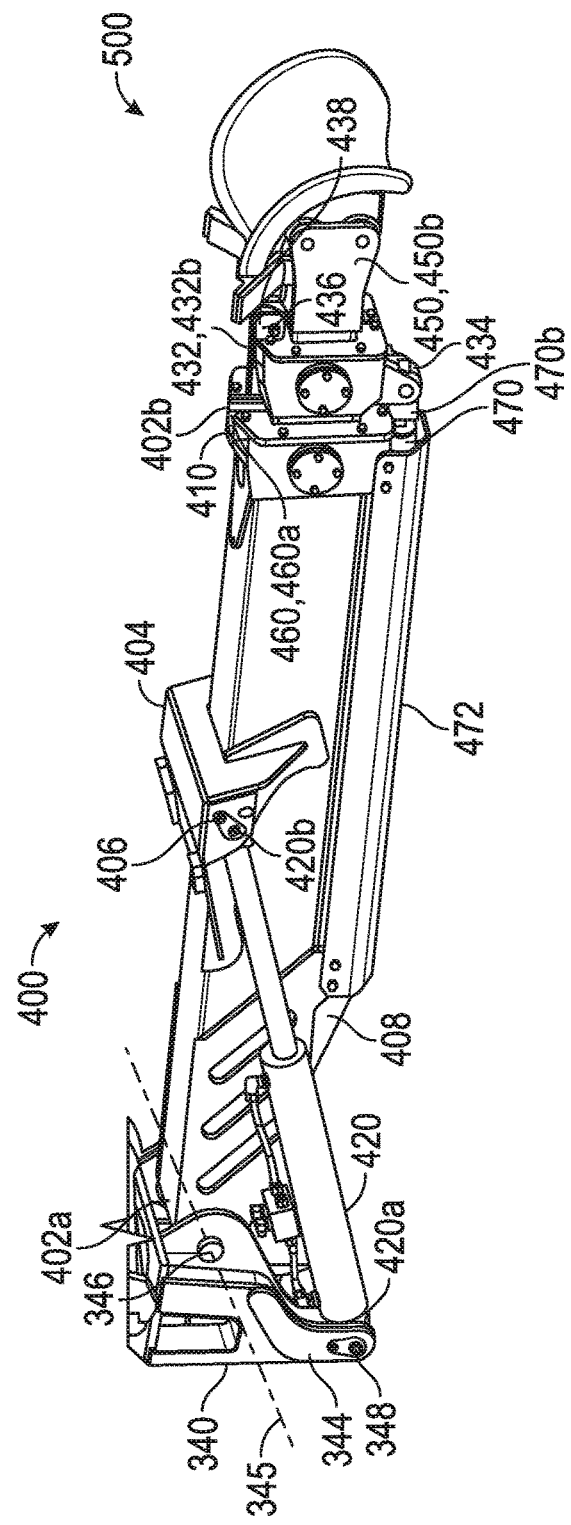
FIG. 11A
FIG. 11B

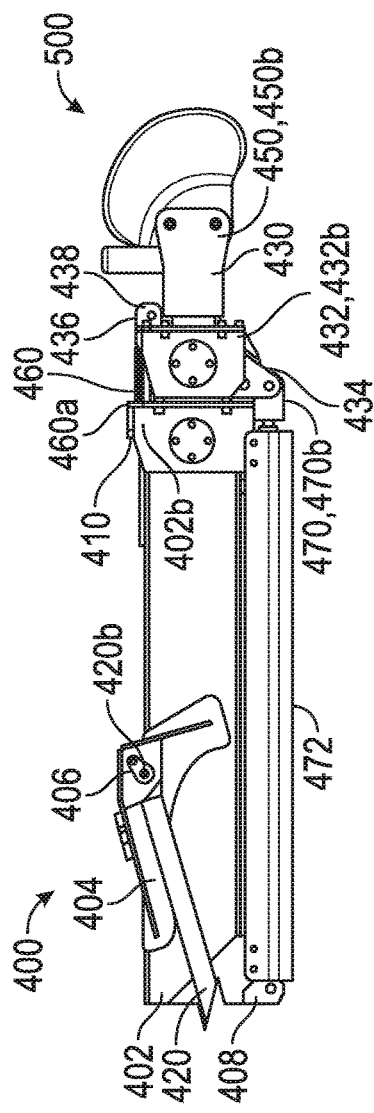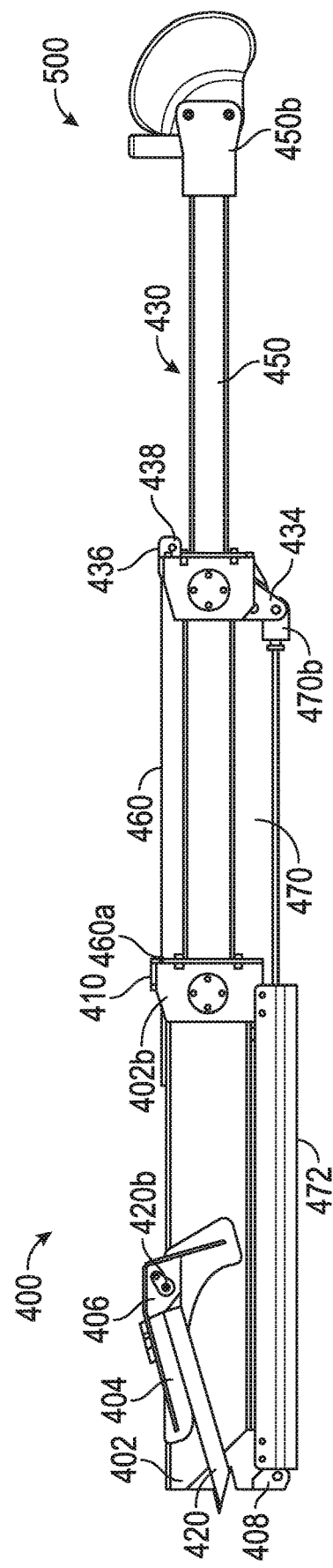
FIG. 13A
FIG. 13B

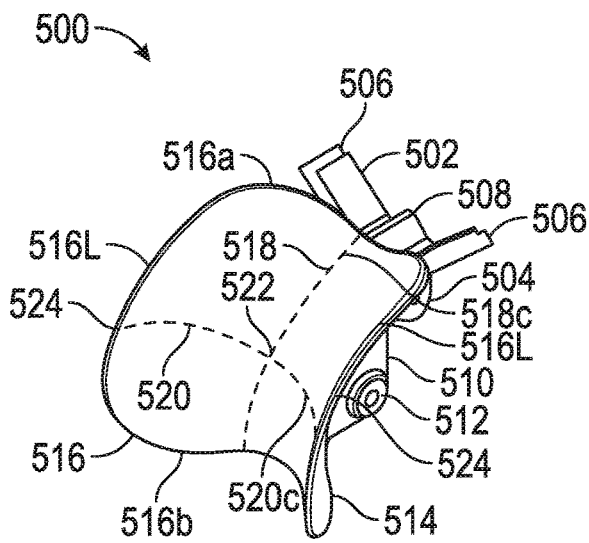
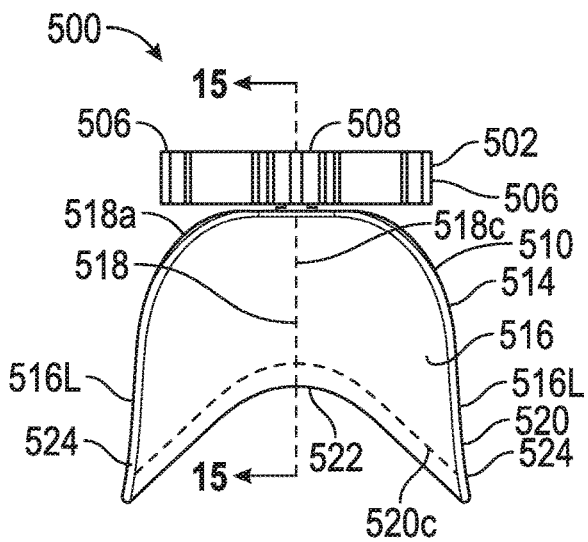
FIG. 15A
FIG. 15B
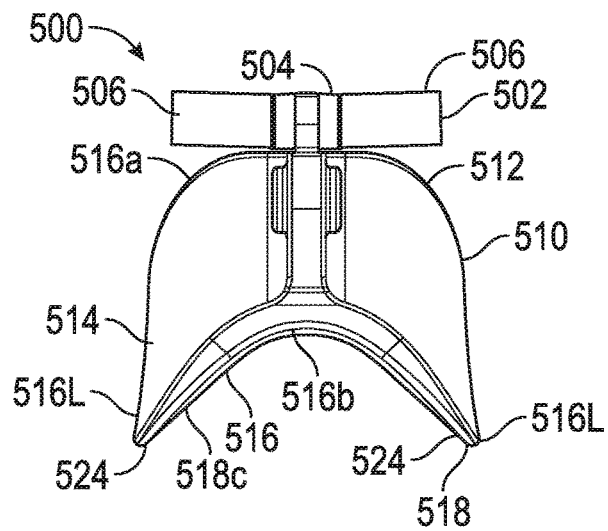
FIG. 15C
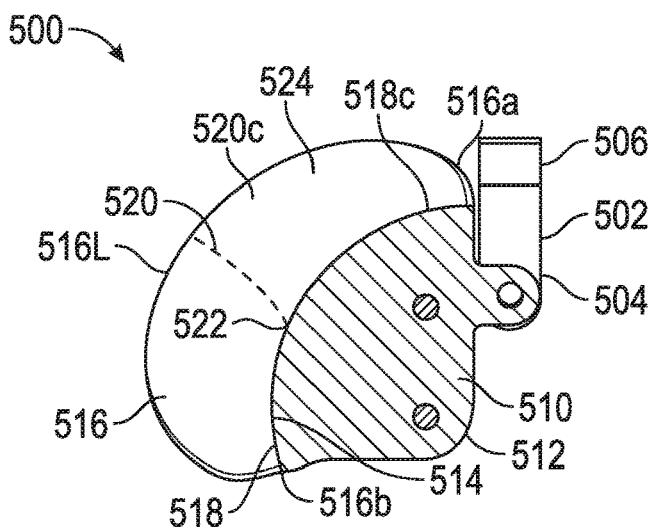
FIG. 15D

PIPE STAND TRANSFER SYSTEM

CROSS-REFERENCE TO RELATED APPLICATIONS

This application is a 35 U.S.C. § 371 national stage application of PCT/US2016/046481 filed Aug. 11, 2016, and entitled "Pipe Stand Transfer System," which claims benefit of U.S. application No. 62/214,084 filed Sep. 3, 2015, both of which are incorporated herein by reference in their entirety for all purposes.

STATEMENT REGARDING FEDERALLY SPONSORED RESEARCH OR DEVELOPMENT

Not applicable.

BACKGROUND

This disclosure relates generally to systems and methods for handling pipes and other elongated tubular members during well drilling, preparation, and maintenance. More particularly, this disclosure relates to systems and methods for handling elongated tubular members in a controlled manner near a drilling platform while inserting or removing the elongated tubular members from a wellbore.

"Tripping" is a term of art used in drilling operations that generally refers to acts of either adding multiple joints of tubular drill pipe to, or removing multiple joints of drill pipe from, a wellbore. Oftentimes during drilling operations, tripping operations may be performed wherein the drill string is pulled from the wellbore in order to change the drill bit, or to run various other types of equipment, such as testing equipment and the like, into the wellbore on the end of the drill string. For example, when tripping drill pipe out of the wellbore, a traveling block and top drive assembly of the drilling or well system may be raised until a stand of drill pipe (i.e., generally multiple connected sections, or joints, of drill pipe) extends above the drilling rig floor. In some cases, a stand of drill pipe may comprise three threaded joints of drill pipe totaling approximately 90 feet in length. Thereafter, slips are placed between the string of drill pipe and the drilling rig floor in order to suspend the drill string in and above the wellbore from a point beneath the bottom threaded joint of the stand of drill pipe that is to be removed from the drill string. In this position, the drill string extends above the drilling rig floor, and the upper end, or box end, of the string is positioned above the plane of a fingerboard suspended above the drilling rig floor on a mast extending upward from the drilling rig floor. In some cases, the fingerboard may be located 75 feet or more above the drilling rig floor.

Once the drill string has been suspended with its box end positioned above the fingerboard, the threaded connection between the stand of drill pipe and the remainder of the drill string is then unthreaded, and the lower end, or pin end, of the stand is guided away from the remainder of the drill string and wellbore and placed on a support pad—sometimes referred to as a setback—on the drilling rig floor. Next, the box end of the stand of drill pipe is removed from the traveling block and the stand is typically manually guided by drilling rig personnel to the fingerboard, where it is staged between a set of racking fingers in a substantially vertical orientation. The top drive assembly is then lowered to the box end of the suspended drill string by the traveling block and coupled to the drill string. Thereafter, the drill string is again lifted to a position where the box end is positioned above the plane of the fingerboard, and the process is repeated until all of the sections of pipe—e.g., in three joint stands—are supported at their respective pin ends on the setback, with their respective box ends being constrained between pairs of racking fingers on the fingerboard. When a new drill bit or other type of tool is being run into the well, the above-described tripping process is reversed and repeated, as the pin end of each stand of drill pipe is threaded into the box end of the drill string, and the drill string is lowered into the well until the drill bit or other tool reaches a desired depth in the wellbore.

The movement of stands of drill pipe from the top drive assembly to the racking fingers of the fingerboard is often manually effectuated by rig personnel, who may pull and/or push the drill pipe to its proper staging location. Similarly, the lower end of the pipe stand being tripped out of the wellbore is also supported and guided manually by rig personnel on the drilling rig floor. It is known that such movements of large sections of drill pipe may involve a variety of difficulties that, if not properly addressed by rig personnel involved in the work, may be hazardous to those personnel, both those working on the rig floor and those near the fingerboard, who may be nearly 100 feet above the rig floor.

BRIEF SUMMARY OF THE DISCLOSURE

An embodiment of a pipe handler for handling tubular members of a well system comprises a mounting member for mounting the pipe handler to a structure of the well system, a first arm having a first end coupled to a structure of the well system, and a second end, wherein the first arm is configured to pivot relative to the mounting member about a first axis, a second arm having a first end and a second end, a connector coupled to the second end of the first arm and the first end of the second arm, and wherein the connector is configured to rotate the second arm about a second axis, and a guide member coupled to the second end of the second arm for guiding a tubular member, wherein the second arm is configured to pivot relative to the connector about a third axis. In some embodiments, the guide member comprises an engagement surface having a concave axis, and a convex axis intersecting the concave axis. In some embodiments, the guide member comprises an engagement surface having outwardly flared ends for maintaining physical engagement between the engagement member and the tubular member. In certain embodiments, the pipe handler further comprises a magnet coupled to the guide member to exert a magnetic force on the tubular member. In certain embodiments, the guide member comprises an engagement surface for guiding the tubular member, and wherein the guide member is unattached to the tubular member such that the tubular member is free to slide against the engagement surface when being guided. In some embodiments, the second arm comprises a telescoping assembly configured to extend a length of the second arm. In some embodiments, the second axis is disposed orthogonal to the third axis.

An embodiment of a pipe handler for handling tubular members of a well system comprises a first arm having a first end coupled to a structure of the well system, and a second end, a second arm having a first end and a second end, a connector coupled to the second end of the first arm and the first end of the second arm, the connector being configured to permit the second arm to pivot relative to the first arm, and a guide member coupled to the second end of the second arm for guiding a tubular member, wherein the guide member comprises an engagement surface having a concave axis, and a convex axis intersecting the concave axis. In some embodiments, the engagement surface of the guide member comprises outwardly flared ends for biasing the tubular member to remain in physical engagement with the guide member as the tubular member is in motion. In some embodiments, the pipe handler further comprises a magnet coupled to the guide member to exert a magnetic force on the tubular member. In certain embodiments, the guide member is unattached to the tubular member such that the tubular member is free to slide against the engagement surface when being guided. In certain embodiments, the second arm comprises a telescoping assembly configured to extend a length of the second arm. In some embodiments, the first arm is configured to pivot about a first axis relative to the mounting member, the connector is configured to rotate the second arm about a second axis, and the second arm is configured to pivot about a third axis relative to the connector. In some embodiments, the second axis is disposed orthogonal to the third axis.

An embodiment of a well system comprises a rig having a rig floor and a structure extending from the rig floor, and a pipe handler for handling tubular members of a well system, comprising: a first arm having a first end coupled to the structure, and a second end, wherein the first arm is configured to pivot relative to the structure about a first axis, a second arm having a first end and a second end, a connector coupled to the second end of the first arm and the first end of the second arm, and wherein the connector is configured to rotate the second arm about a second axis, and a guide member coupled to the second end of the second arm for guiding a tubular member, wherein the second arm comprises a telescoping assembly configured to extend a length of the second arm. In some embodiments, the guide member comprises an engagement surface having a concave axis, and a convex axis intersecting the concave axis. In some embodiments, the guide member comprises an engagement surface having outwardly flared ends for biasing the tubular member to remain in physical engagement with the guide member as the tubular member is in motion. In certain embodiments, the well system further comprises a magnet coupled to the guide member to exert a magnetic force on the tubular member. In certain embodiments, the guide member comprises an engagement surface for guiding the tubular member, and wherein the guide member is unattached to the tubular member such that the tubular member is free to slide against the engagement surface when being guided. In some embodiments, the well system further comprises a mounting member coupling the first arm to the structure and wherein: the first arm is configured to pivot relative to the mounting member about a first axis, the connector is configured to rotate the second arm about a second axis, and the second arm is configured to pivot relative to the connector about a third axis.

BRIEF DESCRIPTION OF THE DRAWINGS

For a detailed description of the disclosed exemplary embodiments, reference will now be made to the accompanying drawings in which:

FIG. 11A is a first perspective view of an embodiment of a second arm assembly of the pipe handler assembly shown in FIG. 4;

FIG. 11B is a second perspective view of the second arm assembly shown in FIG. 11A;

FIG. 13A is a zoomed-in side view of the second arm assembly shown in FIG. 11A in a distended position;

FIG. 13B is a zoomed-in side view of the second arm assembly shown in FIG. 11A in a telescoped position;

FIG. 15A is a perspective view of a guide assembly of the pipe handler assembly shown in FIG. 4;

FIG. 15B is a top view of the guide assembly shown in FIG. 15A;

FIG. 15C is a bottom view of the guide assembly shown in FIG. 15A;

FIG. 15D is a cross-sectional view along line 15-15 of FIG. 15B of the guide assembly shown in FIG. 15A;

DETAILED DESCRIPTION OF THE DISCLOSED EMBODIMENTS

Figure 1:
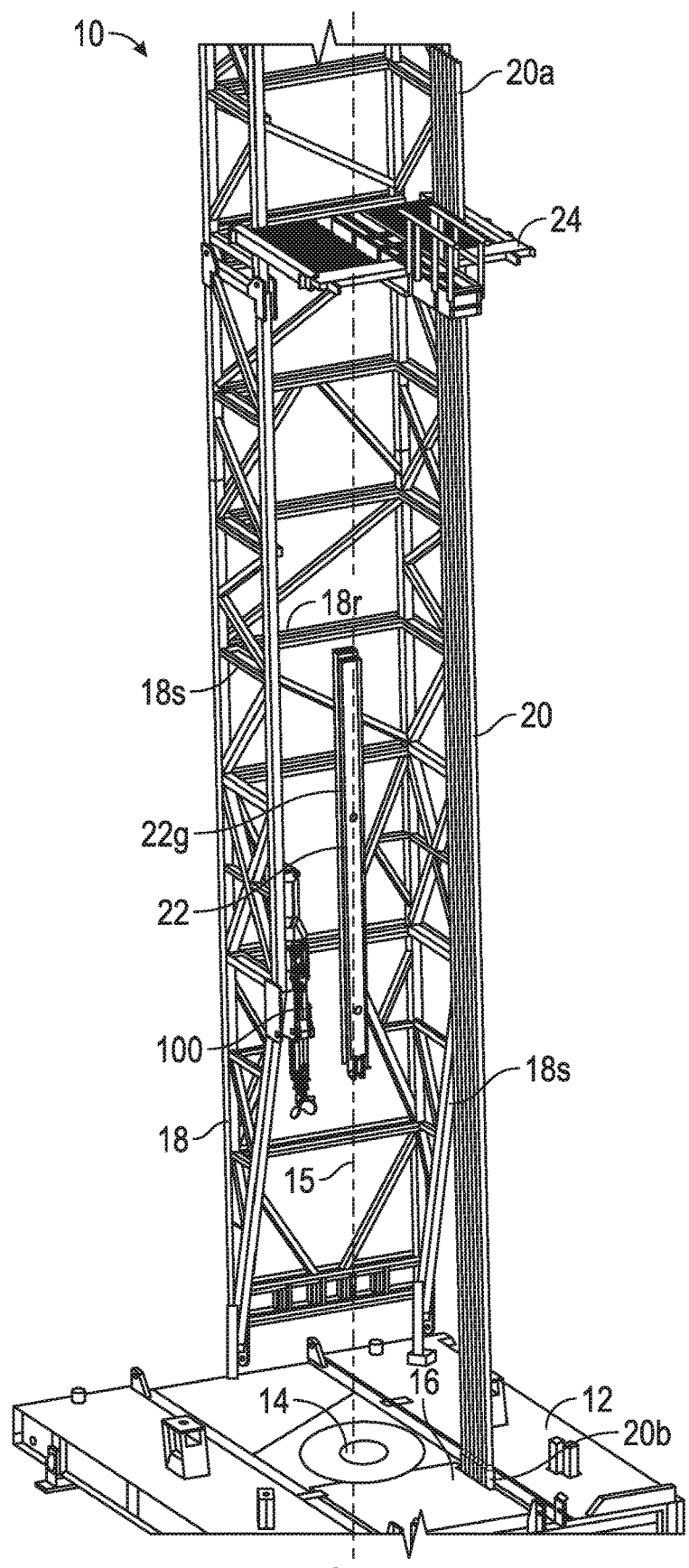
FIG. 1 is a schematic perspective view of an embodiment of a well system in accordance with principles disclosed herein.

The following description is exemplary of embodiments of the disclosure. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment. The drawing figures are not necessarily to scale. Certain features and components disclosed herein may be shown exaggerated in scale or in somewhat schematic form, and some details of conventional elements may not be shown in the interest of clarity and conciseness.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections.

In some of the figures, one or more components or aspects of a component may be not displayed or may not have reference numerals identifying the features or components that are identified elsewhere in order to improve clarity and conciseness of the figure. In addition, as used herein, the terms "axial" and "axially" generally mean along or parallel to a given axis (e.g., central axis of a body or a port), while the terms "radial" and "radially" generally mean perpendicular to the axis. For instance, an axial distance refers to a distance measured along or parallel to the axis, and a radial distance means a distance measured perpendicular to the axis.

Figure 2:
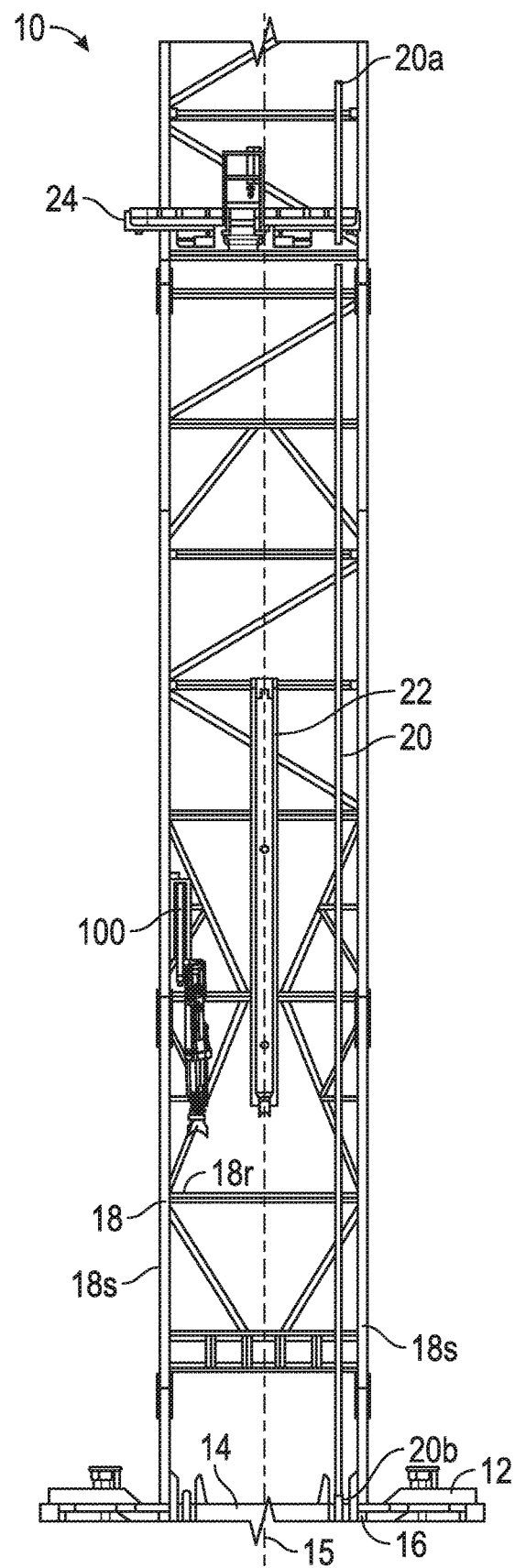
FIG. 2 is a schematic front view of the well system shown in FIG. 1.
Figure 3:
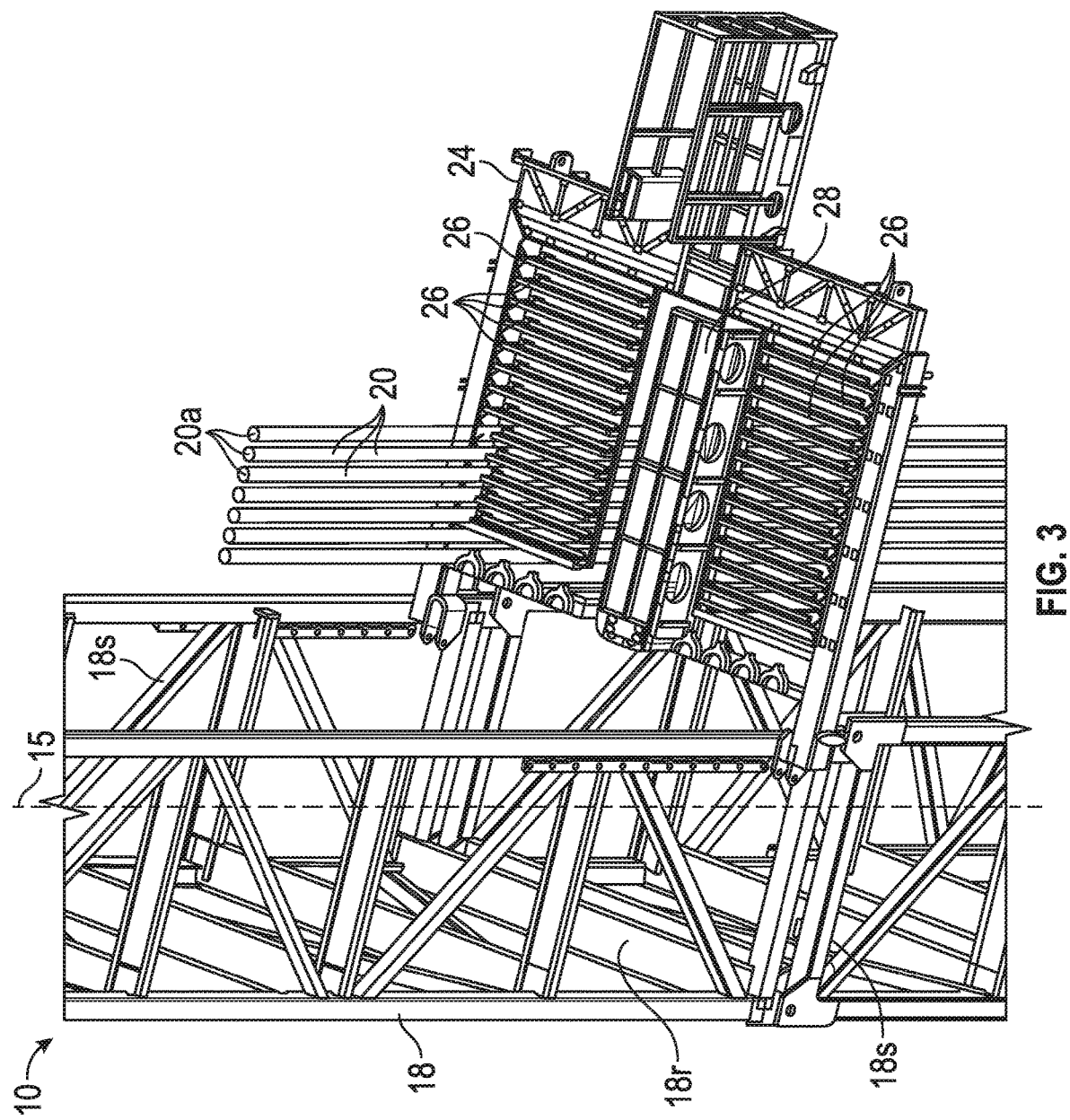
FIG. 3 is a zoomed-in perspective view of an embodiment of a fingerboard assembly of the well system shown in FIG. 1.

Referring to FIGS. 1-3, an embodiment of a well system 10 is shown that includes a rig floor 12 having a hole 14 extending therethrough for the insertion and removal of tubular members or pipe stands 20, where a wellbore centerline 15 extends through hole 14. Each pipe stand 20 has a first or upper box end 20a and a second or lower pin end 20b; and in an embodiment, each pipe stand 20 comprises three drill pipe joints threadably coupled end-to-end. Pipe stands 20 are disposed vertically in a setback area 16 of rig floor 12 distal the wellbore centerline 15 of well system 10. The vertical positioning of pipe stands 20 reduces the footprint of rig floor 12, allowing for a more compact, and more easily transportable well system 10.

In the embodiment of FIGS. 1-3, well system 10 also includes a structure or mast 18 that extends vertically from the rig floor 12 for supporting components of well system 10 disposed above rig floor 12. Mast 18 is generally rectangular in cross-section and comprises a pair of sides 18s and a rear 18r, with the wellbore centerline 15 extending between sides 18s of mast 18. The rear 18r of mast 18 supports a beam or torque tube 22 mounted thereon and configured to react torque generated by a top drive assembly (not shown) of well system 10 against mast 18. Specifically, the top drive assembly is suspended from an upper end of mast 18, and is configured to travel vertically along wellbore centerline 15 and to rotate each pipe stand 20 as the pipe stands 20 are tripped into or out of the wellbore. The torque tube 22 engages the top drive assembly and prevents the top drive assembly from rotating as the top drive applies torque against and rotates a pipe stand 20. The torque tube 22 is positioned in well system 10 such that torque tube 22 extends parallel with wellbore centerline 15 but is radially offset from wellbore centerline 15. A lateral side of torque tube 22 includes a longitudinally extending groove 22g.

In the embodiment of FIGS. 1-3, well system 10 also includes a fingerboard 24 mounted to mast 18 distal the rig floor 12 and near the upper end 20a of pipe stands 20. Shown particularly in FIG. 3, the fingerboard 24 extends outwardly from the sides 18s of mast 18 and includes two sets of racking fingers 26 for supporting the upper end 20a of each pipe stand 20. During tripping into and out of the wellbore, the upper end 20a of a pipe stand 20 is transferred between a racking finger 26 of fingerboard 24, which is radially offset from wellbore centerline 15, and an elevator (not shown) of the top drive assembly configured to grapple and support the upper end 20a of the pipe stand 20 being tripped into or out of the wellbore. To effectuate the process of transferring the upper end 20a of a pipe stand 20 between a racking finger 26 and the elevator, rig personnel may stand on an access platform or diving board 28 disposed between the sets of racking fingers 26 of fingerboard 24, and using ropes or chains disposed around the upper end 20a of the pipe stand 20, may pull the upper end 20a of the pipe stand 20 between the elevator and the racking fingers 26. Alternatively, in other embodiments an automated system may be used to transfer the upper end 20a of the pipe stand 20 between the elevator and the racking fingers 26 of fingerboard 24, such as the systems discussed U.S. Pat. No. 8,317,448, the entire contents of which are incorporated herein by reference.

When tripping a pipe stand 20 into a wellbore, after the upper end 20a of the pipe stand 20 has been grappled by the elevator of the top drive assembly, the upper end 20a is disposed proximal wellbore centerline 15 and the pipe stand 20 is displaced vertically upwards in the mast 18 to allow the lower end 20b to clear the rig floor 12. Particularly, when tripping into the wellbore an upper end 20a of a second pipe stand 20 extends vertically from hole 14 in rig floor 12. Thus, in order for the pipe stand 20 being tripped into the wellbore to be made up with the second pipe stand 20 extending from the rig floor 12, the pipe stand 20 being tripped must be displaced vertically from rig floor 12 and aligned with wellbore centerline 15 above the upper end 20a of the second pipe stand 20. During this operation, a stand transfer system is used to support and guide the lower end 20b of the pipe stand 20 being tripped as the lower end 20b is displaced vertically upwards from rig floor 12 and displaced horizontally from the setback area 16 of rig floor 12 and into alignment with wellbore centerline 15. Once the pipe stand 20 being tripped into the wellbore is aligned with wellbore centerline 15, the pipe stand 20 may be displaced downwards into engagement with the upper end 20a of the second pipe stand 20 projecting through hole 14 of rig floor, and the pipe stand 20 being tripped may be rotated (e.g., by the top drive assembly or an iron roughneck) to threadably couple the lower end 20b with the upper end 20a of the second pipe stand 20 projecting from the rig floor 12.

In the embodiment of FIGS. 1-3, well system 10 includes a pipe stand transfer system comprising an embodiment of a pipe handler or stand tailing assembly 100, which mounts to a side 18s of mast 18 to guide the lower end 20b of the pipe stand 20 being tripped into or out of the wellbore. As will be discussed further herein, pipe handler assembly 100 is configured to guide the lower end 20b of the pipe stand 20 as the pipe stand 20 is displaced between a setback position at setback area 16 and a wellbore position in alignment with wellbore centerline 15.

Referring generally to FIGS. 1-8B, pipe handler assembly 100 generally includes a mounting member 102, a first or upper arm assembly 200, a connector assembly 300, a second or lower arm assembly 400, and a guide assembly 500. Mounting member 102 is generally configured to mount or affix pipe handler assembly 100 to a desired location of mast 18 of well system 10. Upper arm assembly 200 is pivotally coupled to mounting member 102 and is configured to support connector assembly 300, lower arm assembly 400, and guide assembly 500, and is further configured to rotate between an extended position (shown in FIGS. 4-7, 8B) and a retracted position (shown in FIG. 8A). Connector assembly 300 is coupled to upper arm assembly 200 and is configured to couple upper arm assembly 200 to the lower arm assembly 400 and guide assembly 500, and to rotate lower arm assembly 400 and guide assembly 500 about an axis of rotation 305. Lower arm assembly 400 is coupled to connector assembly 300 and is configured to support the guide assembly 500 and to displace the guide assembly 500 between an angularly retracted position and an angularly extended position. Lower arm assembly 400 is further configured to displace guide assembly 500 between an axially distended position and an axially telescoped position. Guide assembly 500 is coupled to lower arm assembly 400 and is configured to guide a tubular member, such as a pipe stand 20. Particularly, guide assembly 500 is configured to guide the lower end 20b of a pipe stand 20 between the setback area 16 of rig floor 12 and a position proximal, or coaxial with, wellbore centerline 15, for tripping into or out of a wellbore.

Figure 7:
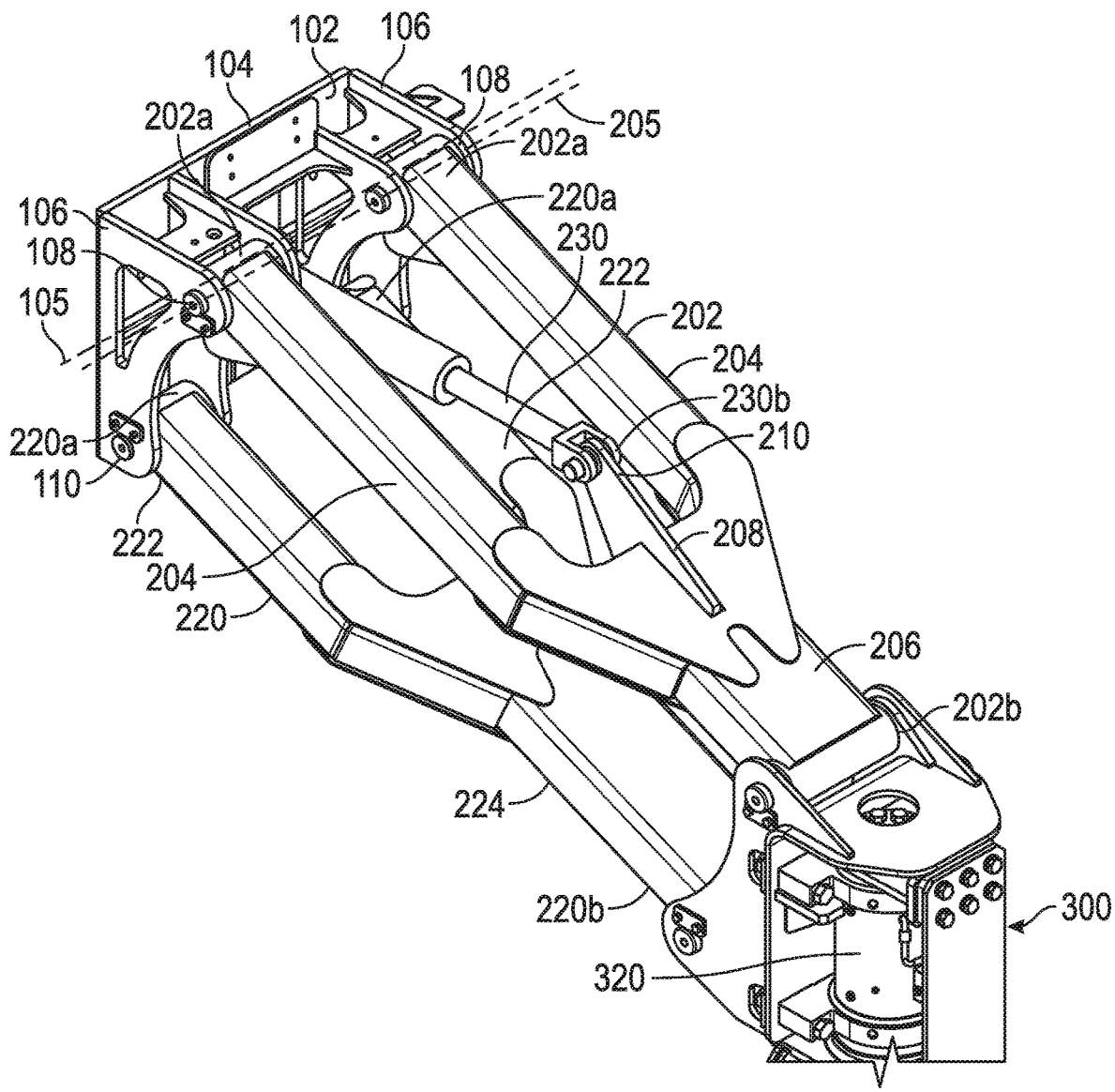
FIG. 7 is a zoomed-in perspective view of an embodiment of a first arm assembly of the pipe handler assembly shown in FIG. 4.
Figure 8:
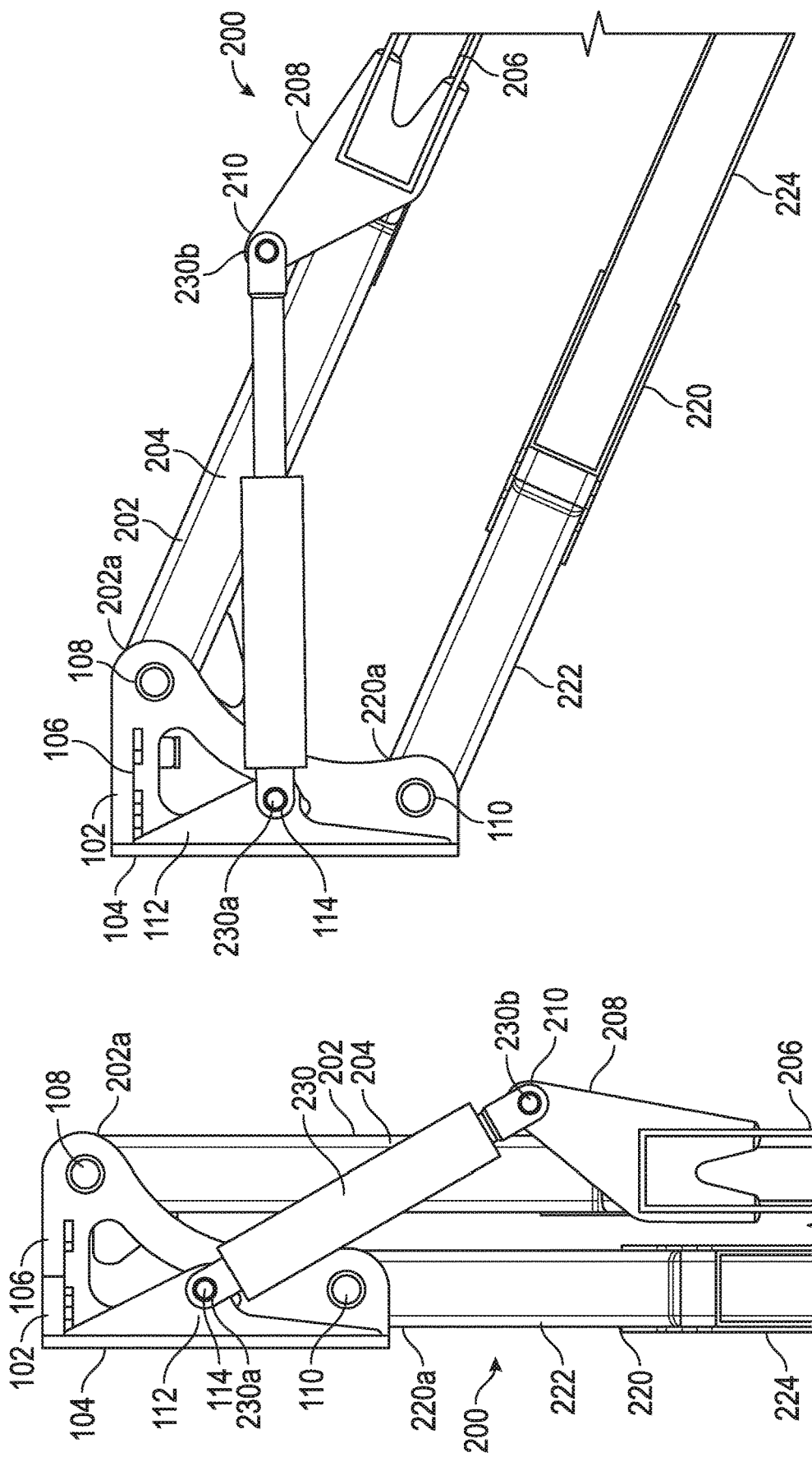
FIG. 8A is a side cross-sectional view along line 8-8 of FIG. 6 of the first arm assembly shown in FIG. 7 in a retracted position.
FIG. 8B is a side cross-sectional view of the first arm assembly shown in FIG. 7 in an extended position.

Referring to FIGS. 7-8B, in this embodiment mounting member 102 has a central or longitudinal axis 105, and includes a mounting plate 104 for affixing mounting member 102 to the mast 18, and a pair of axially spaced outer mounting arms 106 extending from mounting plate 104. Each outer mounting arm 106 comprises a first or upper pivot joint 108 and a second or lower pivot joint 110, where upper pivot joints 108 are positioned farther from mounting plate 104 than lower pivot joints 110. In other words, upper pivot joints 108 are further offset from longitudinal axis 105 than lower pivot joints 110. Mounting member 102 further includes a central mounting arm 112 (shown in FIGS. 8A and 8B) disposed axially between the pair of outer mounting arms 106 and includes a central pivot joint 112 that is offset both axially and radially from upper pivot joints 108 and lower pivot joints 110. Particularly, central pivot joint 112 is less radially offset from longitudinal axis 105 than upper pivot joints 108, and thus, central pivot joint 112 is disposed closer to mounting plate 104 than upper pivot joints 108 of outer mounting arms 106.

In this embodiment, upper arm assembly 200 generally includes an upper pivot arm 202 and a lower pivot arm 220, each of which are coupled between the mounting member 104 and the connector assembly 300. Upper arm assembly 200 further includes an actuator 230 coupled between the mounting member 104 and the upper pivot arm 202. Upper pivot arm 202 has a first or inner end 202a pivotally coupled to mounting member 104 at upper pivot joints 108, and a second or outer end 202b pivotally coupled to connector assembly 300. Upper pivot arm is configured to pivot about a first or upper pivot axis 205 extending through upper pivot joints 108. Particularly, upper pivot arm 202 generally comprises an A-frame having a pair of spaced inner arms 204 pivotally coupled to mounting member 104 at upper pivot joints 108, and intersecting at a single outer arm 206 that pivotally couples to connector assembly 300. Upper pivot arm 202 also includes a mounting bracket 208 extending towards mounting member 104 from outer arm 206, where mounting bracket 208 includes an arm pivot joint 210. Lower pivot arm 220 has a first or inner end 220a pivotally coupled to mounting member 104 at lower pivot joints 110 and a second or outer end 220b pivotally coupled to connector assembly 300. Particularly, lower pivot arm 220 generally comprises an A-frame having a pair of spaced inner arms 222 pivotally coupled to mounting member 104 at lower pivot joints 110, and intersecting at a single outer arm 224 that pivotally couples to connector assembly 300.

Actuator 230 has a first or inner end 230a pivotally coupled to mounting member 104 at central pivot joint 112 and a second or outer end 230b coupled to upper arm 202 at arm pivot joint 210. Actuator 230 is generally configured to actuate or axially displace outer end 230b respective inner end 230a in response to an input signal. Actuator 230 is configured to actuate upper arm assembly 200 between the extended position shown in FIG. 8B and the retracted position shown in FIG. 8A. Particularly, because upper pivot joints 108, about which upper pivot arm 202 pivots, are radially offset from central pivot joint 112, about which actuator 230 pivots, actuating actuator 230 from a contracted position (shown in FIG. 8A) to an extended position (shown in FIG. 8B) causes upper arm 202 to rotate counterclockwise (relative to the views shown in FIGS. 8A and 8B) and upper arm assembly 200 to be displaced from the retracted position to the extended position. Similarly, contraction of actuator 230 causes upper arm 202 to rotate clockwise (relative to the views shown in FIGS. 8A and 8B), and upper arm assembly 200 to be displaced from the extended position to the retracted position.

Figure 9:
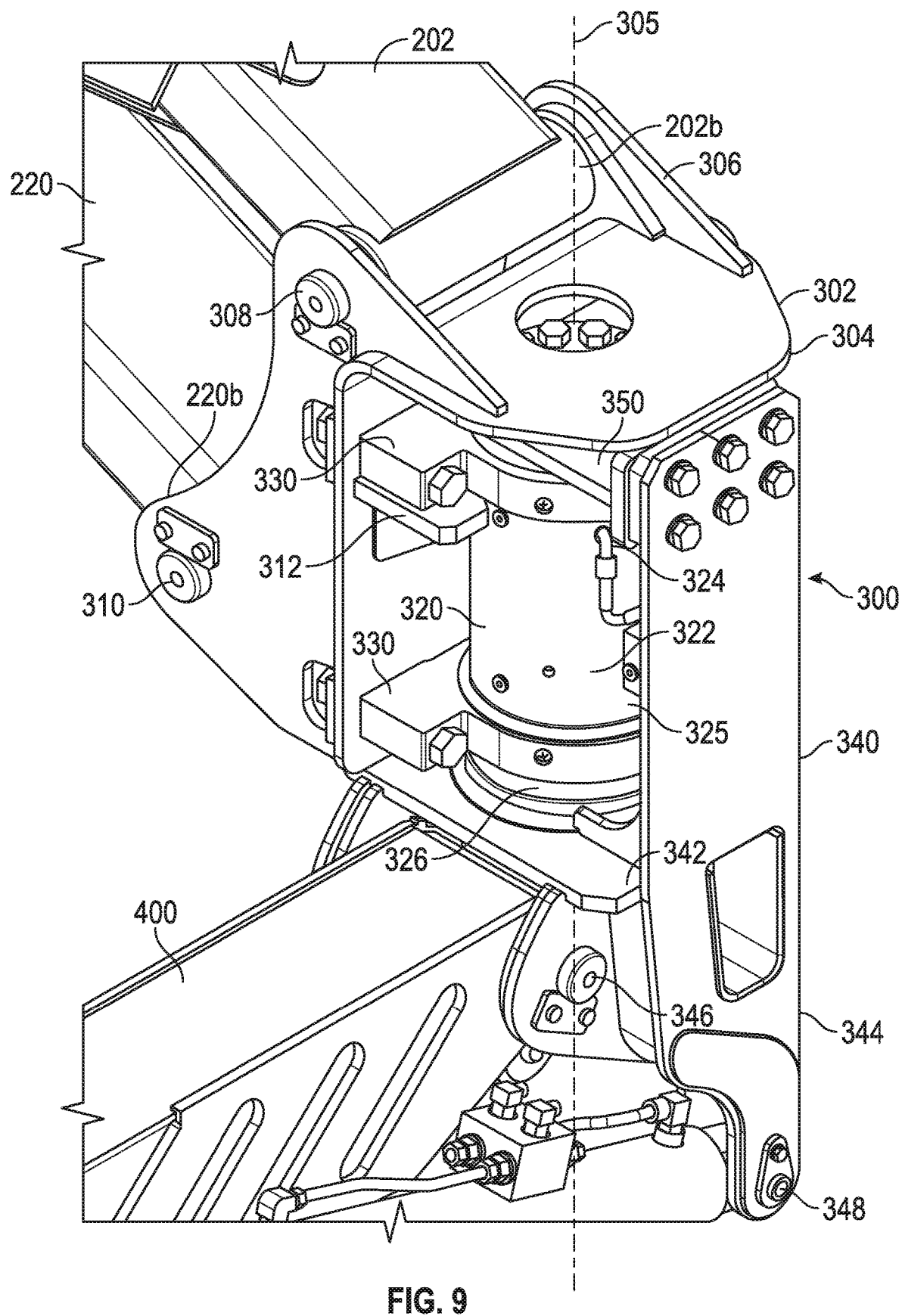
FIG. 9 is a zoomed-in perspective view of an embodiment of a connector assembly of the pipe handler assembly shown in FIG. 4.
Figure 10:
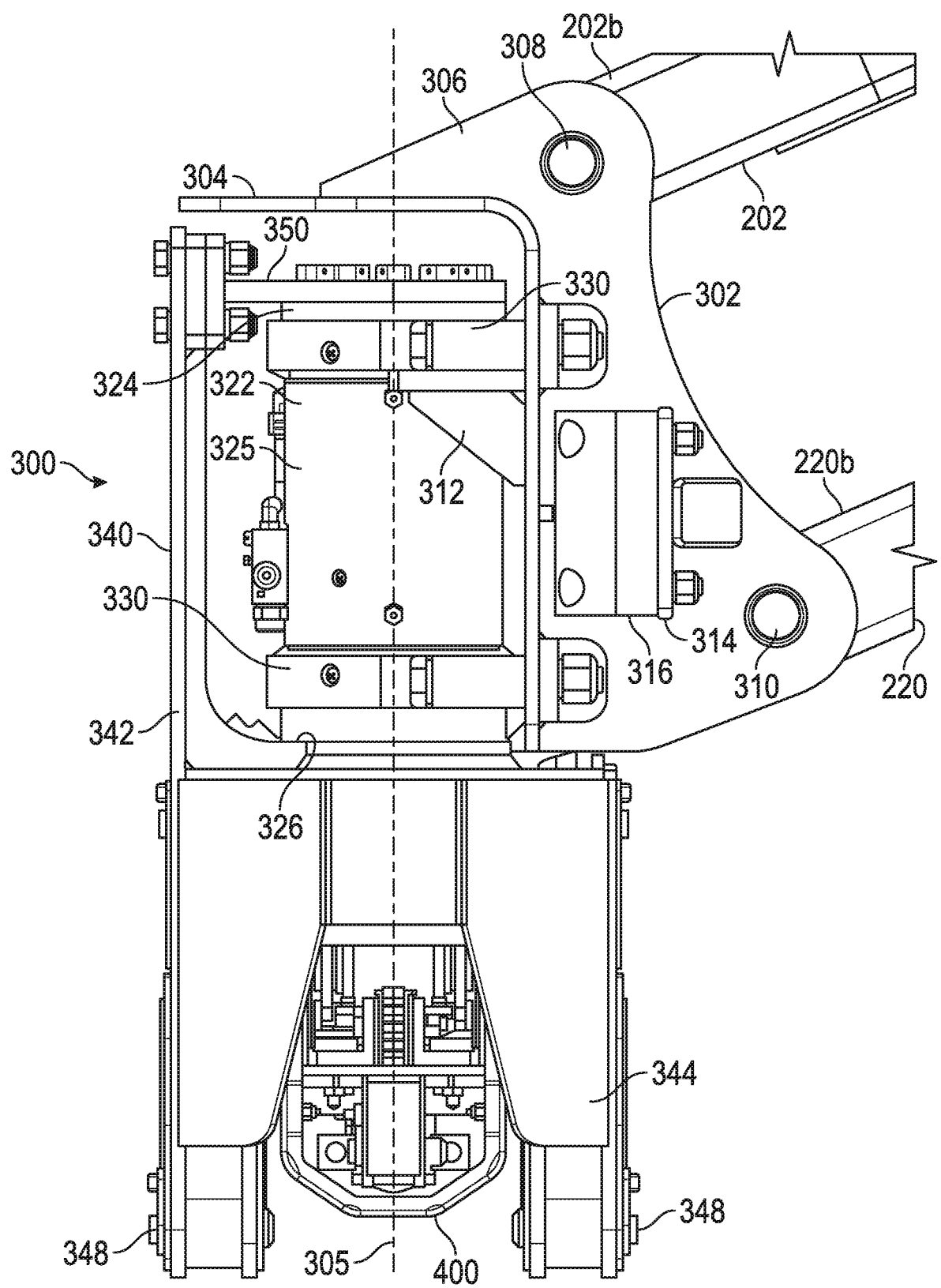
FIG. 10 is a rear view of the connector assembly shown in FIG. 9.
Figure 12A:
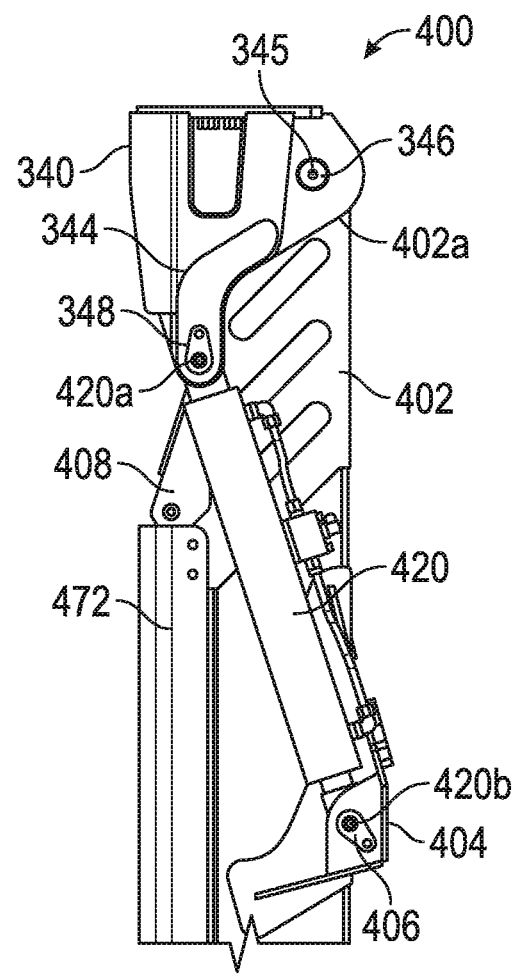
FIG. 12A is a zoomed-in side view of the second arm assembly shown in FIG. 11A in a retracted position.
Figure 12B:
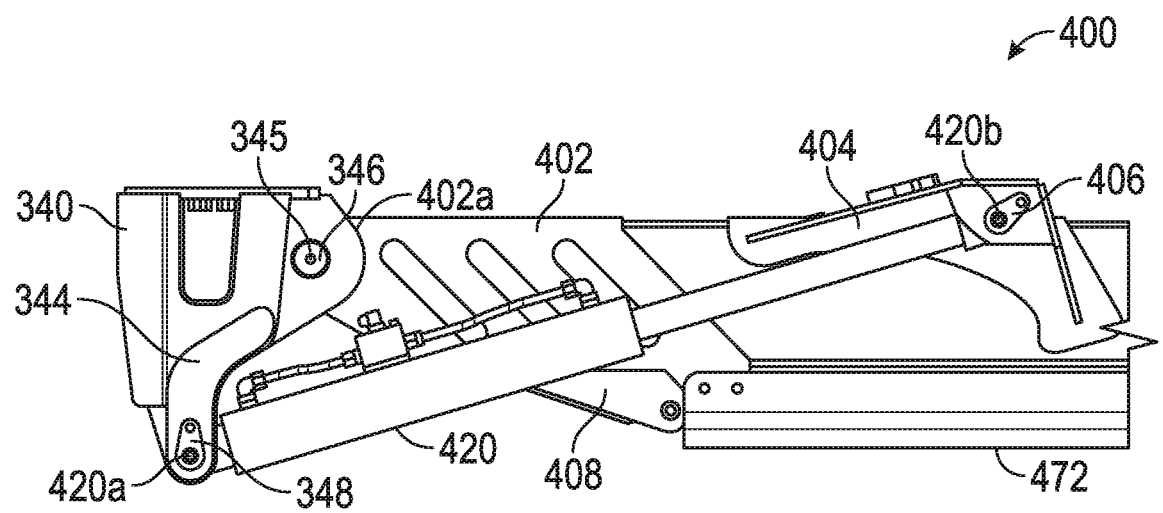
FIG. 12B is a zoomed-in side view of the second arm assembly shown in FIG. 11A in an extended position.
Figure 14:
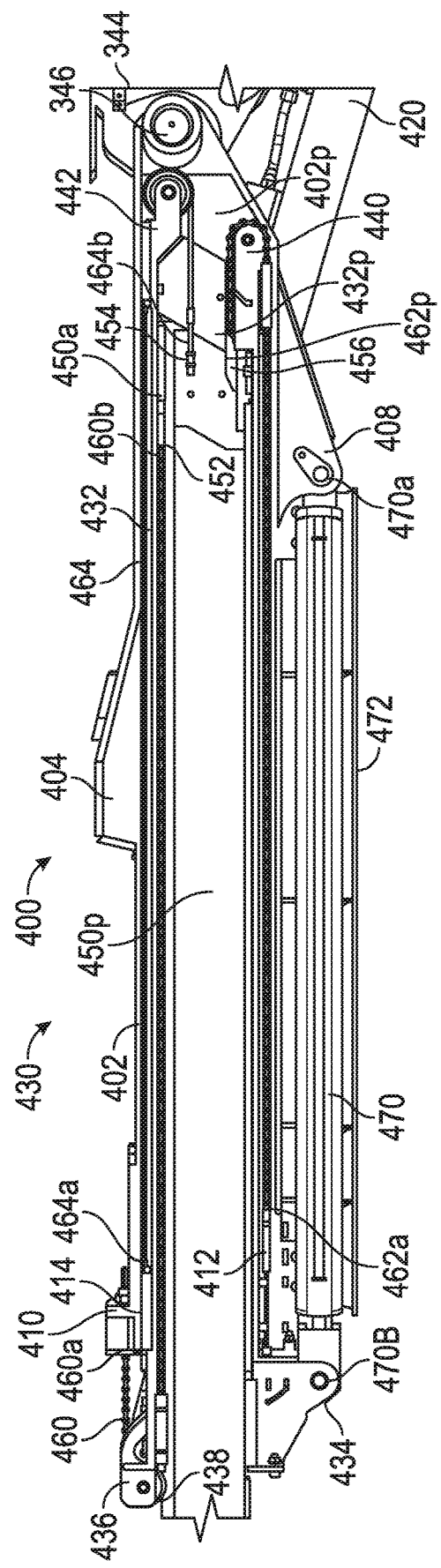
FIG. 14 is a cross-sectional view along line 14-14 of FIG. 5 of an embodiment of a telescoping assembly of the pipe handler assembly shown in FIG. 4.

Referring to FIGS. 9 and 10, in this embodiment connector assembly 300 generally includes a first or upper mounting member 302, a rotary actuator assembly 320, and a second or lower mounting member 340. Upper mounting member 302 is configured to pivotally couple upper arm assembly 200 to the connector assembly 300. In this embodiment, upper mounting member 302 generally includes an L-shaped mounting plate 304 and a pair of mounting arms 306 extending from mounting plate 304. Each outer mounting arm 306 includes a first or upper pivot joint 308 and a second or lower pivot joint 310, where lower pivot joint 310 is positioned farther from mounting plate 304 than upper pivot joint 308. Upper pivot joint 308 pivotally couples to the outer end 202b of upper pivot arm 202, while lower pivot joint 310 pivotally couples to the outer end 220b of lower pivot arm 220, thereby providing a pivotal connection between upper arm assembly 200 and connector assembly 300. Mounting plate 304 also includes a pair of mounting brackets 312 extending from an opposite side of mounting plate 304 than mounting arms 306. Mounting brackets 312 are configured to physically support the rotary actuator 320 of connector assembly 300. Mounting plate 304 further includes a stop member 314 extending orthogonally from one of the mounting arms 306 and having an elastomeric pad 316 disposed at an end thereof. As will be discussed further herein, stop member 314 is configured to engage the longitudinally extending groove 22g of torque tube 22.

In this embodiment, rotary actuator assembly 320 includes a generally cylindrical rotary actuator 322 and a pair of axially spaced mounting brackets 330. Rotary actuator 322 has a first or upper end 324, a second or lower end 326, and is generally configured to impart a rotary motion (i.e., apply a torque) to lower mounting member 340, lower arm assembly 400, and guide assembly 500 about the second or rotation axis 305. Mounting brackets 330 of rotary actuator assembly 320 are generally configured to physically support and couple rotary actuator 322 to the mounting plate 304 of upper mounting member 302 via fasteners that couple to mounting plate 304. The mounting bracket 330 is supported on mounting brackets 312 of upper mounting member 302 for additional support.

Lower mounting member 340 is generally configured to couple rotary actuator assembly 320 to the lower arm assembly 400 and guide assembly 500. In this embodiment, lower mounting member 340 generally includes an L-shaped mounting plate 342 and a pair of mounting arms 344 extending from mounting plate 342. Each outer mounting arm 344 includes a first or upper pivot joint 346 and a pair of radially spaced second or lower pivot joints 348, where lower pivot joints 348 are positioned farther from mounting plate 342 than upper pivot joint 346. In this arrangement, upper pivot joint 346 is radially offset relative to rotation axis 305 from lower pivot joints 348. As will be explained further herein, upper pivot joint 346 and lower pivot joints 348 provide pivotal connections with components of lower arm assembly 400. Mounting plate 342 of lower mounting member 340 also includes a mounting bracket 350 extending from an upper end of mounting plate 342 for coupling with the upper end 324 of rotary actuator 322.

In this configuration, mounting bracket 350 couples to the upper end 324 of rotary actuator 322 while mounting plate 342 couples to the lower end 326 of rotary actuator 322. Specifically, upper end 324 and lower end 326 comprise the terminal ends of a rotatable shaft disposed within rotary actuator 322. Thus, lower mounting member 340, being coupled to upper end 324 and lower end 326 of rotary actuator 322, rotates in concert with the rotatable shaft as the rotatable shaft rotates within a cylindrical housing 325 of rotary actuator 322. Further, mounting brackets 330 of upper mounting member 302 are coupled to the stationary housing 325 of rotary actuator 322, and thus, upper mounting member 302 remains stationary as the rotatable shaft rotates within the housing 325 of rotary actuator 322.

Referring to FIGS. 11A-14, in this embodiment lower arm assembly 400 generally includes a pivot arm 402, a pair of actuators 420, and a telescoping assembly 430. Pivot arm 402 is configured to provide a pivotal connection between connector assembly 300 and the guide assembly 500. In this embodiment, pivot arm 402 has a first or inner end 402a, a second or outer end 402b, and a passage 402p (shown in FIG. 14) extending into pivot arm 402 from outer end 402b for receiving the telescoping assembly 430. The inner end 402a of pivot arm 402 is pivotally coupled to upper pivot joint 346 of lower mounting member 340 to pivotally couple lower arm assembly 400 to the connector assembly 300. In this arrangement, pivot arm 402 may pivot about a third pivot axis 345 extending through upper pivot joint 346. Third pivot axis 345 of pivot joint 346 is at an angle (i.e., orthogonal) relative axis of rotation 305 of connector assembly 300. Pivot arm 402 also includes a pivot mount 404 disposed longitudinally between inner end 402a and outer end 402a and extending from an upper surface of an upper wall of pivot arm 402, where pivot mount 404 includes a pair of spaced pivot joints 406.

Actuators 420 of lower arm assembly 400 each have a first or inner end 420a pivotally coupled to a lower pivot joint 348 of lower mounting member 340, and a second or outer end 420b pivotally coupled to a pivot joint 406 of pivot mount 404. Each actuator 420 is generally configured to actuate or axially displace outer end 420b respective inner end 420a in response to a signal. Actuators 420 are configured to actuate lower arm assembly 400 between a retracted position shown in FIG. 12A and an extended position shown in FIG. 12B. Particularly, because upper pivot joint 348, about which lower pivot arm 402 pivots, is radially offset from lower central pivot joints 348, about which actuators 420 pivot, actuating actuators 420 from a contracted position (shown in FIG. 12A) to an extended position (shown in FIG. 12B) cause pivot arm 402 to rotate counterclockwise (relative to the views shown in FIGS. 12A and 12B) and lower arm assembly 400 to be displaced from the retracted position to the extended position. Similarly, contraction of actuators 420 cause pivot arm 402 to rotate clockwise (relative to the views shown in FIGS. 12A and 12B), and lower arm assembly 400 to be displaced from extended position to the retracted position. Pivot arm 402 of lower arm assembly 400 also includes an actuator mount 408 extending from a lower surface of pivot arm 402. Further, the outer end 402b of pivot arm 402 includes a first chain mount 410 at the upper surface of the upper wall of pivot arm 402. The outer end 402b also includes a second chain mount 412 disposed in passage 402p and coupled to an upper surface of a lower wall of pivot arm 402. The outer end 402b further includes a cable mount 414 disposed in passage 402p and coupled to a lower surface of the upper wall of pivot arm 402.

Telescoping assembly 430 is generally configured to actuate lower arm assembly 400 between a distended position shown in FIG. 13A and a telescoped position shown in FIG. 13B. In the embodiment of FIGS. 4-6 and 11A-14, telescoping assembly 430 generally includes an outer telescoping member 432, an inner telescoping member 450, and a telescoping actuator 470. Outer telescoping member 432 has a first or inner end 432a, a second or outer end 432b, and a passage 432p (shown in FIG. 14) extending into outer telescoping arm 432 from outer end 432b for receiving the inner telescoping member 450. When lower arm assembly 400 is in the distended position shown in FIGS. 13A and 14, the outer telescoping member 432 is received within passage 402p of pivot arm 402.

The outer end 432b of outer telescoping member 432 includes an actuator mount 434 extending from a lower surface of a lower wall of outer telescoping member 432 and an outer pulley mount 436 extending from an upper surface of an upper wall of outer telescoping member 432, where pulley mount includes an outer rotatable chain pulley 438. The inner end 432a of outer telescoping member 432 includes an inner chain pulley 440 extending longitudinally from the lower wall of outer telescoping member 432, and a cable pulley 442 extending longitudinally from the upper wall of outer telescoping member 432. Telescoping actuator 470 has a first or inner end 470a coupled to actuator mount 408 of pivot arm 402, and a second or outer end 470b coupled to actuator mount 434 of outer telescoping member 432. An elongate shield 472 is disposed about telescoping actuator 470 to shield the telescoping actuator 470. Telescoping actuator 470 is generally configured to actuate or axially displace outer end 470b respective inner end 470a in response to an input signal. Thus, telescoping actuator 470 may be actuated to displace outer telescoping member 434 to transition lower arm assembly 400 between the distended and telescoped positions. In the embodiment of FIGS. 4-14, actuators 230, 322, 420, and 470 comprise hydraulically powered actuators; however, in other embodiments actuators 230, 322, 420, and 470 may comprise other types of actuators known in the art, such as electrically and pneumatically powered actuators.

In this embodiment, inner telescoping member 450 has a first or inner end 450a, a second or outer end 450b, and a passage 450p (shown in FIG. 14) extending into inner telescoping arm 450 from inner end 450b. The guide assembly 500 is coupled to inner telescoping member 450 of lower arm assembly 400 at outer end 450b. The inner end 450a of inner telescoping member 450 includes a first chain mount 452 extending from an upper surface of an upper wall of inner telescoping member 450. The inner end 450a also includes a cable mount 454 extending into passage 450p from a lower surface of the upper wall of inner telescoping member 450, and a second chain mount 456 extending into passage 450p from an upper surface of a lower wall of inner telescoping member 450.

Telescoping assembly 430 also includes a first chain 460, a second chain 462, and a cable 464. First chain 460 has a first end 460a coupled to first chain mount 410 of pivot arm 402 and a second end 460b coupled to first chain mount 452 of inner telescoping member 450. The first chain 460 is also supported and guided by chain pulley 438 of outer telescoping member 432. Second chain 462 has a first end 462a coupled to second chain mount 412 of pivot arm 402 and a second end 462b coupled to second chain mount 456 of inner telescoping member 450. The second chain 462 is also supported and guided by inner chain pulley 440 of the outer telescoping member 432. Cable 464 has a first end 464a coupled to chain mount 414 of pivot arm 402 and a second end 464b coupled to chain mount 454 of inner telescoping member 450. Cable 464 is also supported and guided by cable pulley 442 of the outer telescoping member 432. Although in the embodiment of FIGS. 11A-14 first chain 460 and second chain 462 comprise a chain, in other embodiments first chain 460 and second chain 462 may comprise other flexible members known in the art, such as wires, cables, etc. Similarly, while in the embodiment of FIGS. 4-6 and 11A-14 cable 464 comprises a cable, in other embodiments cable 464 may comprise other flexible members known in the art, such as wires, chains, etc.

First chain 460, second chain 462, cable 464, and their associated mounts and pulleys described above are configured to "slave" inner telescoping member 450 to outer telescoping member 432. In other words, as telescoping actuator 470 is actuated to extend outer end 470b, and outer telescoping member 432 coupled thereto, to telescope or displace outer telescoping member 432 longitudinally outwards from passage 402p of pivot arm 402, chains 460, 462, and cable 464 act to telescope or displace inner telescoping member 450 longitudinally outwards from passage 432p of outer telescoping member 432. Similarly, as telescoping actuator 470 is actuated to retract outer ends 470b to displace outer telescoping member 432 longitudinally into passage 402p of pivot arm 402, chains 460, 462, and cable 464 act to displace inner telescoping member 450 longitudinally into passage 432p of outer telescoping member 432.

Specifically, as outer telescoping member 432 is telescoped outwards from passage 402p of pivot arm 402 by the actuation of telescoping actuator 470, first chain 460 is placed in tension and second end 460b of first chain 460 pulls on first chain mount 452 to telescope inner telescoping member 450 outwards from the passage 402p of pivot arm 402. Further, as outer telescoping member 432 is displaced into passage 402p of pivot arm 402 by the actuation of telescoping actuator 470, second chain 462 and cable 464 are each placed into tension, with second end 462b of second chain 462 pulling on second chain mount 456 of inner telescoping member 450 and second end 464b of cable 464 pulling on cable mount 454 of inner telescoping member 450 to displace inner telescoping member 450 into passage 432p of outer telescoping member 432. Therefore, although telescoping actuator 470 does not act directly on inner telescoping member 450, the actuation of telescoping actuator 470 serves to displace both the outer telescoping member 432 and the inner telescoping member 450, causing both outer telescoping member 432 and inner telescoping member 450 from their respective passages (i.e., 402p and 432p) when lower arm assembly is in the telescoped position shown in FIG. 13B.

Figure 4:
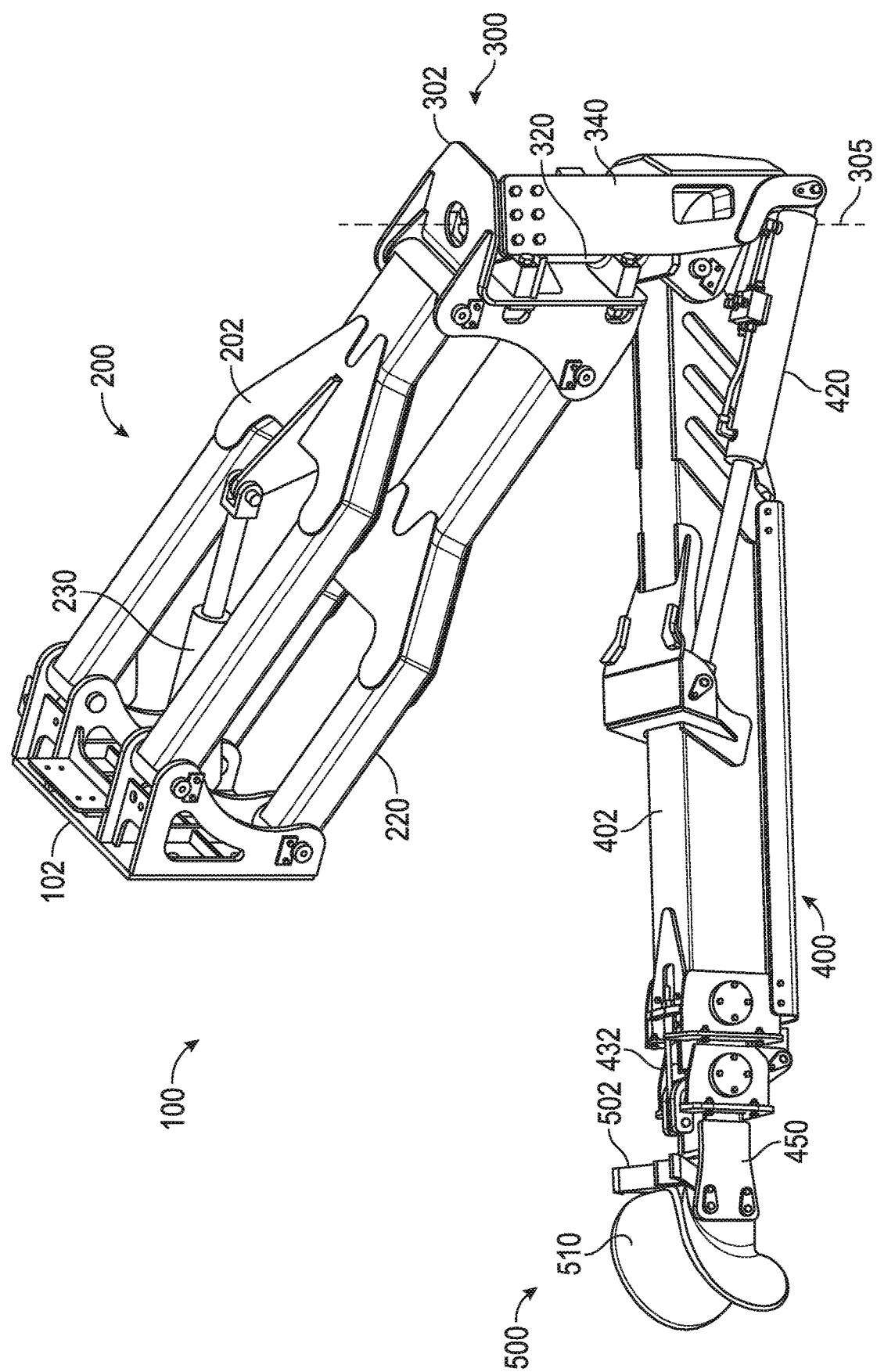
FIG. 4 is a perspective view of an embodiment of a pipe handler assembly of the well system shown in FIG. 1 in accordance with principles disclosed herein.
Figure 5:
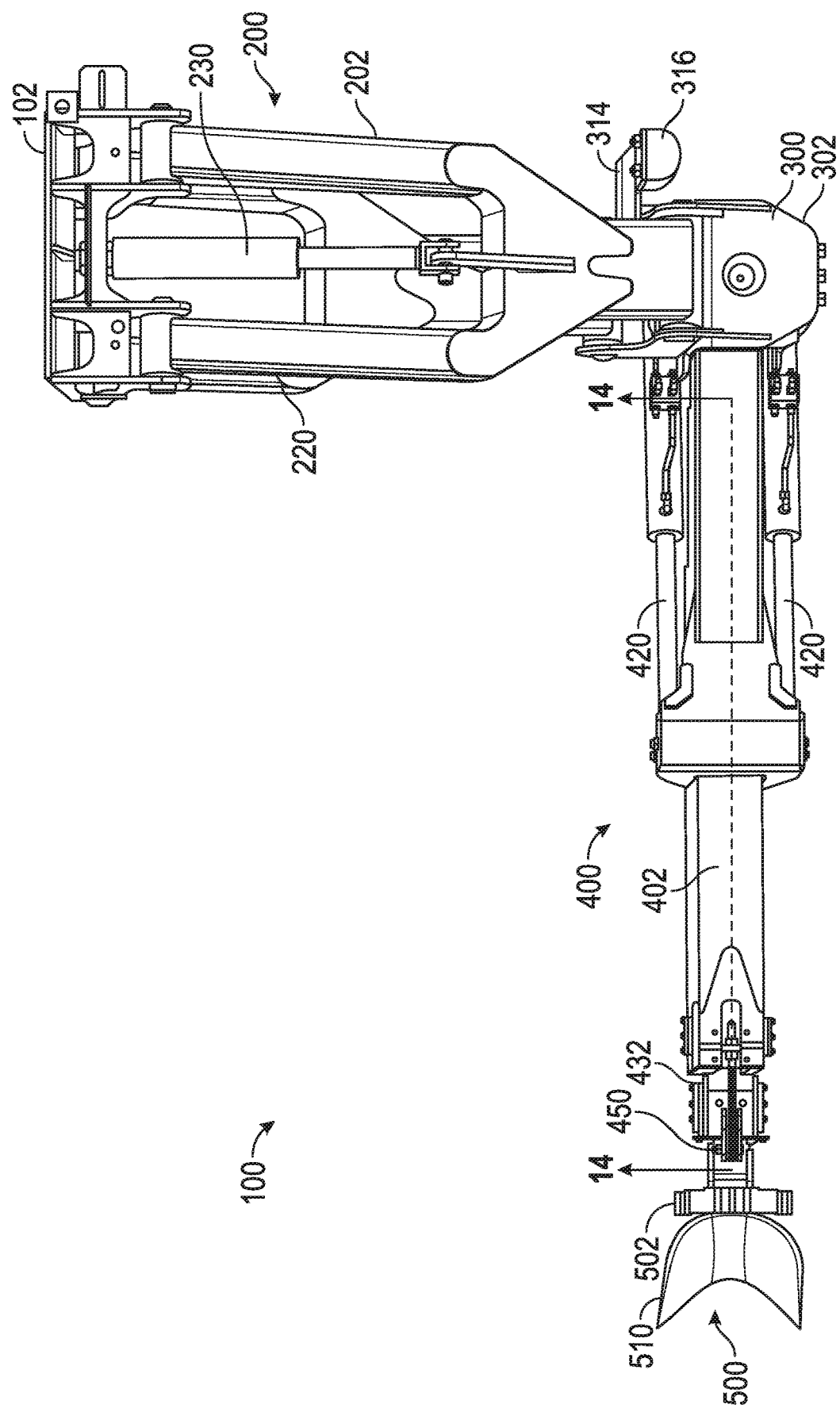
FIG. 5 is a top view of the pipe handler assembly shown in FIG. 4.
Figure 6:
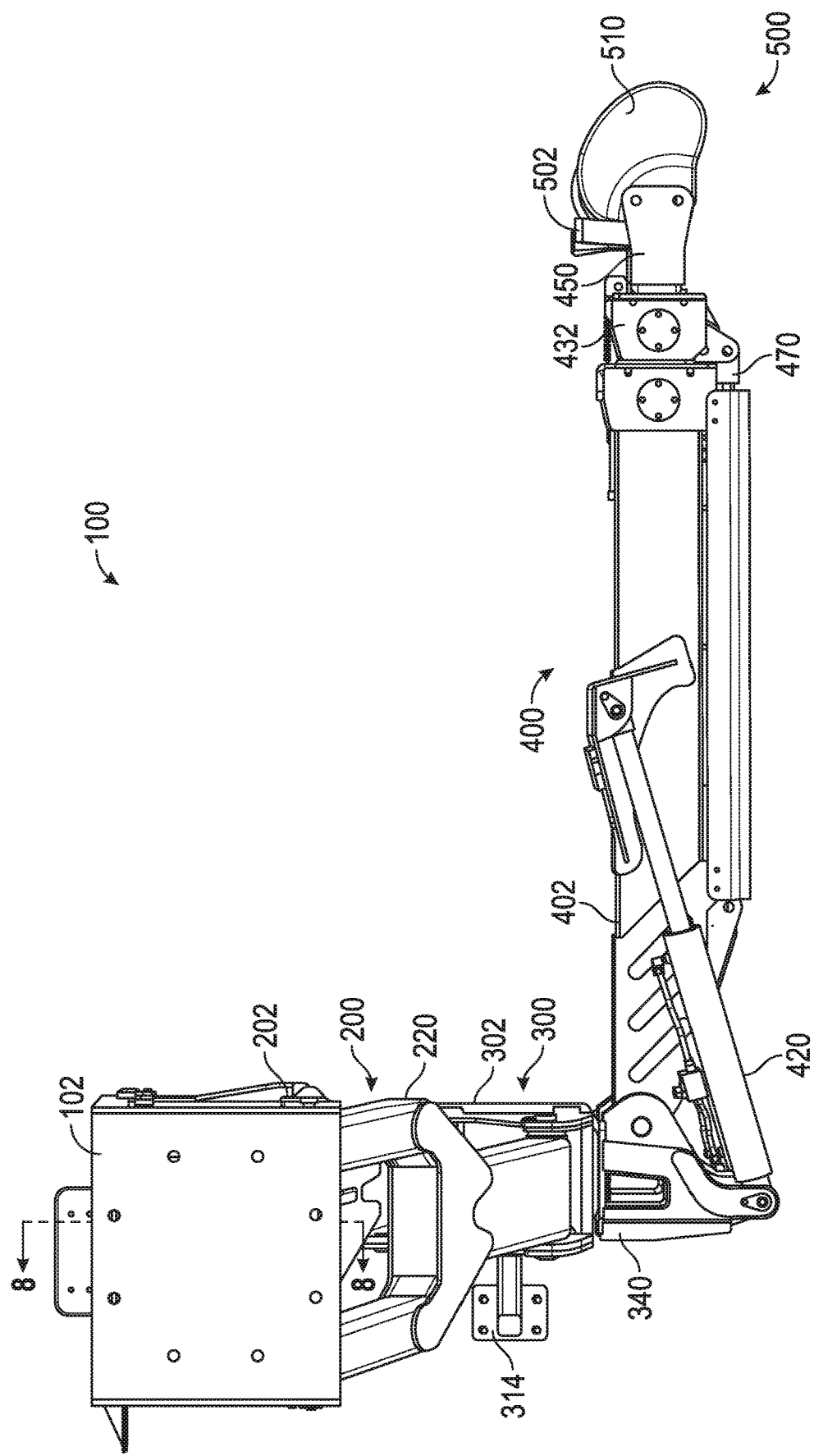
FIG. 6 is a side view of the pipe handler assembly shown in FIG. 4.

Referring to FIGS. 15A-15D, guide assembly 500 of pipe handler assembly 100 is configured to guide a tubular member during a tripping operation. Particularly, guide assembly 500 is configured to guide the lower end 20b of a pipe stand 20 as the pipe stand 20 is tripped into or out of a wellbore. In the embodiment of FIGS. 15A-15D, guide assembly 500 generally includes a magnet 502 and a guide member 510. As shown in FIGS. 4-6, both magnet 502 and guide member 510 of guide assembly 500 are coupled or affixed to the outer end 450b of the inner telescoping member 450 of lower arm assembly 400. Magnet 502 has a mounting portion 504 for coupling with outer end 450b of inner telescoping member 450, a pair of outer elongate portions 506 extending at angles from mounting portion 504, and a central elongate portion 508 disposed between outer elongate portions 506, where outer elongate portions 506 have a greater longitudinal length than central elongate portion 508. Magnet 502 is disposed between guide member 510 and lower arm assembly 400, and is configured to exert a magnetic force on a tubular member, such as a pipe stand 20. Particularly, magnet 502 is configured to exert a magnetic force on the lower end 20b of a pipe stand 20 as the pipe stand 20 is guided by guiding member 510 during a tripping operation.

Guide member 510 is generally configured to guide a tubular member. Particularly, guide member 510 is configured to guide the lower end 20b of a pipe stand 20 (or a single pipe or other tubular) when the pipe stand 20 is tripped into or out of a wellbore. For instance, guide member 510 is configured the lower end 20b of tubular member 20 into alignment with wellbore centerline 15. In the embodiment of FIGS. 4-6 and 15A-15D, guide member 510 has a mounting portion 512 and an engagement portion 514, where mounting portion 512 is configured to couple guide member 510 to the outer end 450b of the inner telescoping member 450, and the engagement portion 514 is configured to physically engage and guide a tubular member (e.g., a pipe stand 20) during a tripping operation. Magnet 502 works in conjunction with the engagement portion 514 by exerting a magnetic force on the tubular member to hold the tubular member in physical engagement or contact with the engagement portion 514 of guide member 510. In this embodiment, engagement portion 514 and guide member 510 do not include any actuators for engaging and guiding a tubular member, thereby reducing the number of actuators in pipe handler assembly 100, and in turn reducing the overall complexity of pipe handler assembly 100. Further, by reducing the number of actuators in pipe handler assembly 100, guide member 510 may reduce the number of potential failure points of pipe handler assembly 100. Therefore, as guide assembly 500 guides a tubular member (e.g., a pipe stand 20) during a tripping operation, movement between the tubular member and guide assembly 500 is not restricted.

In the embodiment of FIGS. 15A-15D, engagement portion 514 of guide member 510 is generally saddle shaped. Specifically, engagement portion 514 includes an engagement surface 516 having a first or upper end 516a, a second or lower end 516b, and a pair of lateral ends 516L. Engagement surface 516 includes a convex curved axis 518 extending between the upper end 516a and the lower end 516b. Engagement surface 516 also includes a concave curved axis 520 extending between lateral ends 516L. Convex axis 518 and concave axis 520 intersect at an intersection point 522. In an embodiment, intersection point 522 is disposed substantially equidistantly between lateral ends 516L of engagement surface 516. In an embodiment, convex axis 518 is orientated orthogonal to the concave axis 520 of engagement surface 516. In an embodiment, the intersection point 522 comprises a saddle point of engagement surface 516.

In the embodiment of FIGS. 15A-15D, concave axis 520 of engagement surface 516 produces flared ends 524 at the lateral ends 516L of engagement surface 516. The flared ends 524 of engagement surface 516 are configured to "catch" or prevent a tubular member engaging engagement surface 516 from sliding axially (respective concave axis 520) out of engagement with engagement surface 516 as the tubular member is tripped into or out of the wellbore. Also, as will be discussed further herein, during a tripping operation the longitudinal axis of the tubular member being tripped may be disposed at an angle relative a longitudinal axis of lower arm assembly 400. Further, the angle between the longitudinal axis of the tubular member and the longitudinal axis of lower arm assembly 400 may change as the tripping operation is performed.

Figure 16:
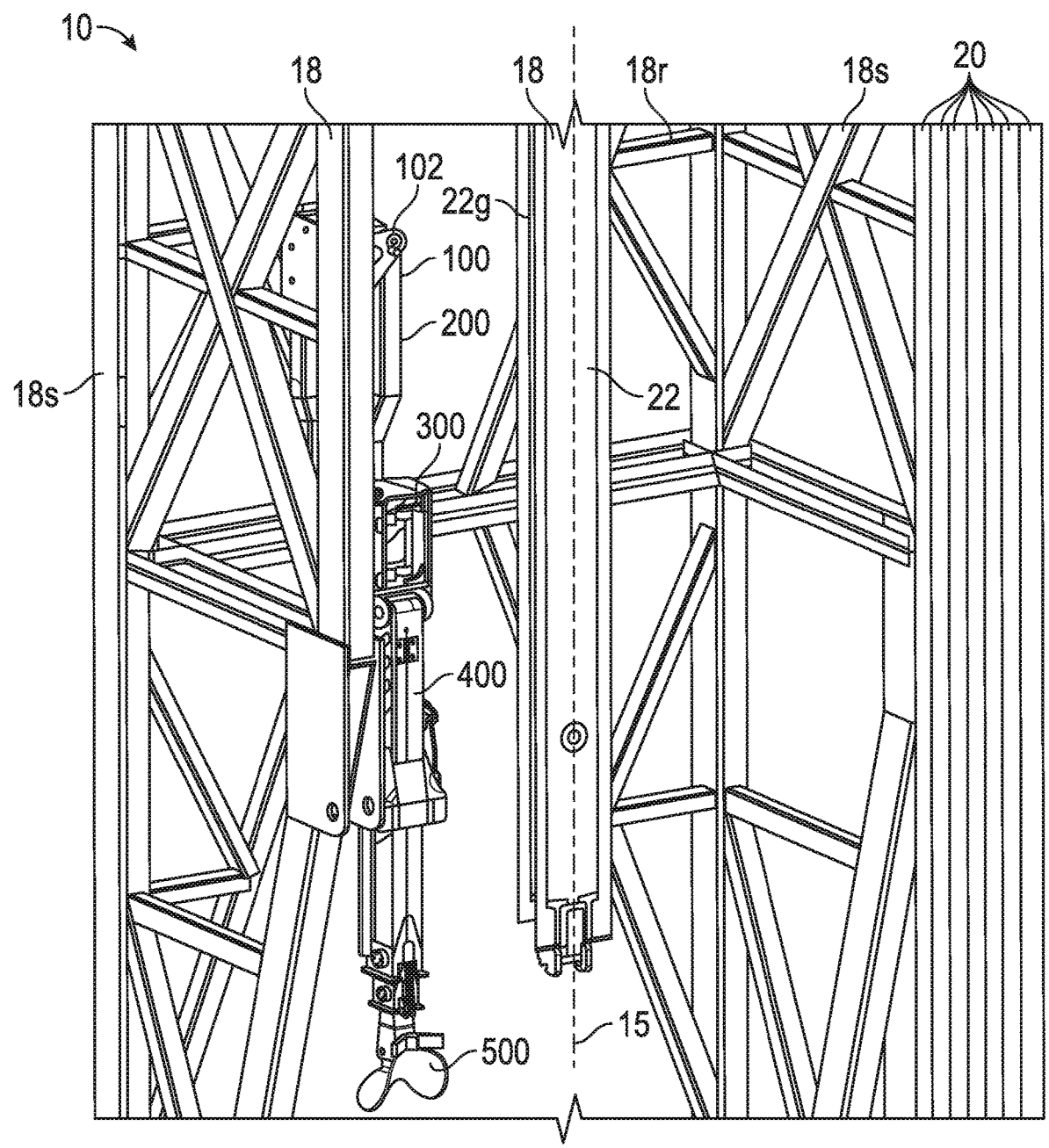
FIG. 16 is a zoomed-in perspective view of the well system shown in FIG. 1 with the pipe handler assembly in a stowed position.

Referring to FIGS. 16-21, pipe handler assembly 100 is illustrated during various stages of tripping a pipe stand 20 into the wellbore of well system 10. Particularly, FIG. 16 illustrates pipe handler assembly 100 in a stowed or retracted-retracted position and each pipe stand 20 of well system disposed in setback position in setback area 16 (not shown), distal wellbore centerline 15. In the stowed position of pipe handler assembly 100, upper arm assembly 200 is disposed in the retracted position extending vertically downwards (relative wellbore centerline 15) from mounting member 102. Also, lower arm assembly 400 is disposed in the retracted position extending vertically downwards from connector assembly 300. In this position, a longitudinal axis of upper arm assembly 200 is disposed parallel with a longitudinal axis of lower arm assembly 400. Further, lower arm assembly 400 is also in the distended position. In this arrangement, pipe handler assembly 100 is disposed distal the wellbore centerline 15, allowing for components of well system 10, such as the top drive assembly and other associated components, to traverse along wellbore centerline 15 within mast 18 without colliding with pipe handler assembly 100. In the event that actuator 230 of upper arm assembly 200 and actuators 420 of lower arm assembly 400 lose power, the pipe handler assembly 100 will naturally transition to the stowed position, with actuators 230 and 420 in contracted positions, allowing for the continued operation of well system 10.

Figure 17:
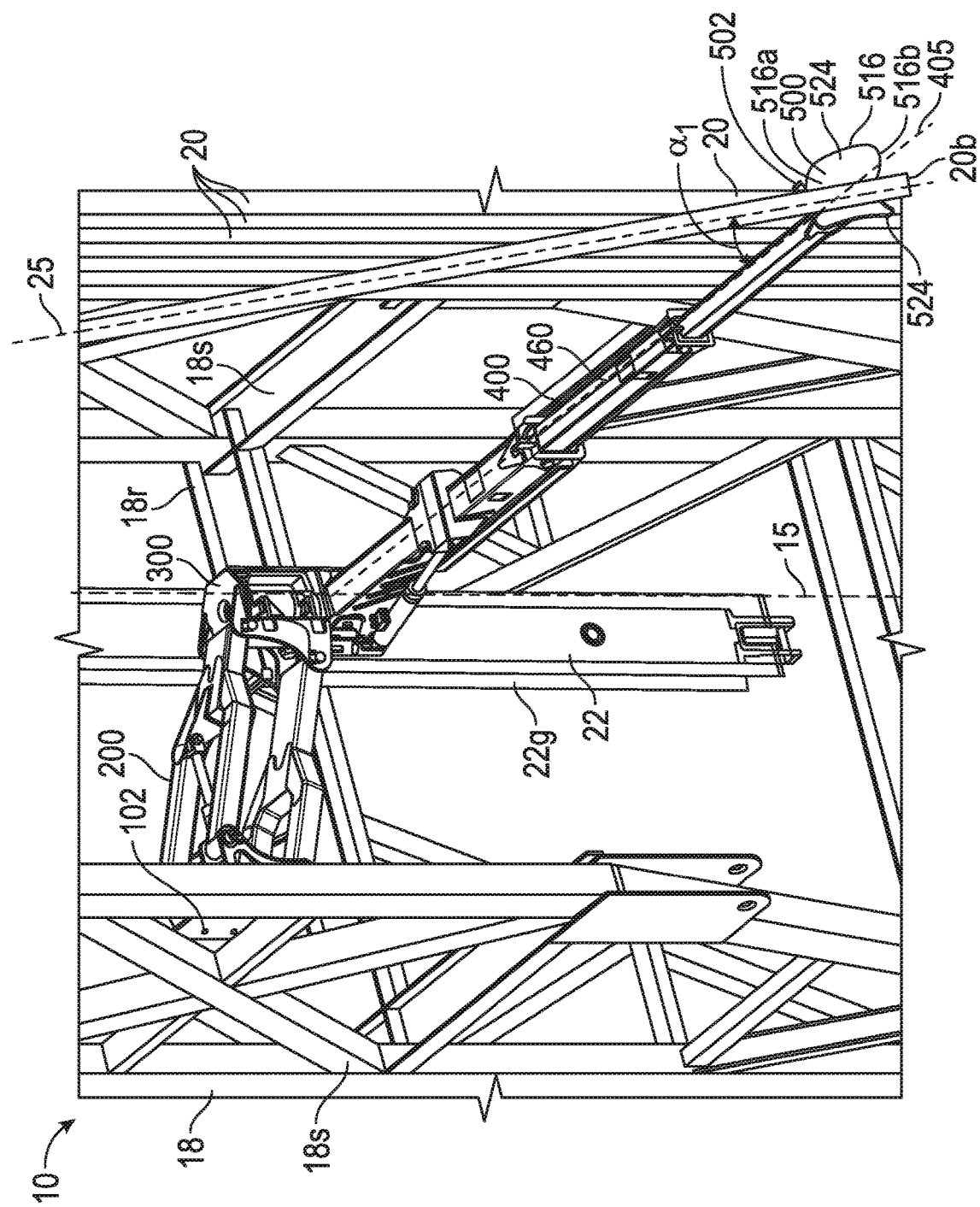
FIG. 17 is a zoomed-in perspective view of the well system shown in FIG. 1 with the pipe handler assembly in an extended-telescoped position.
Figure 18:
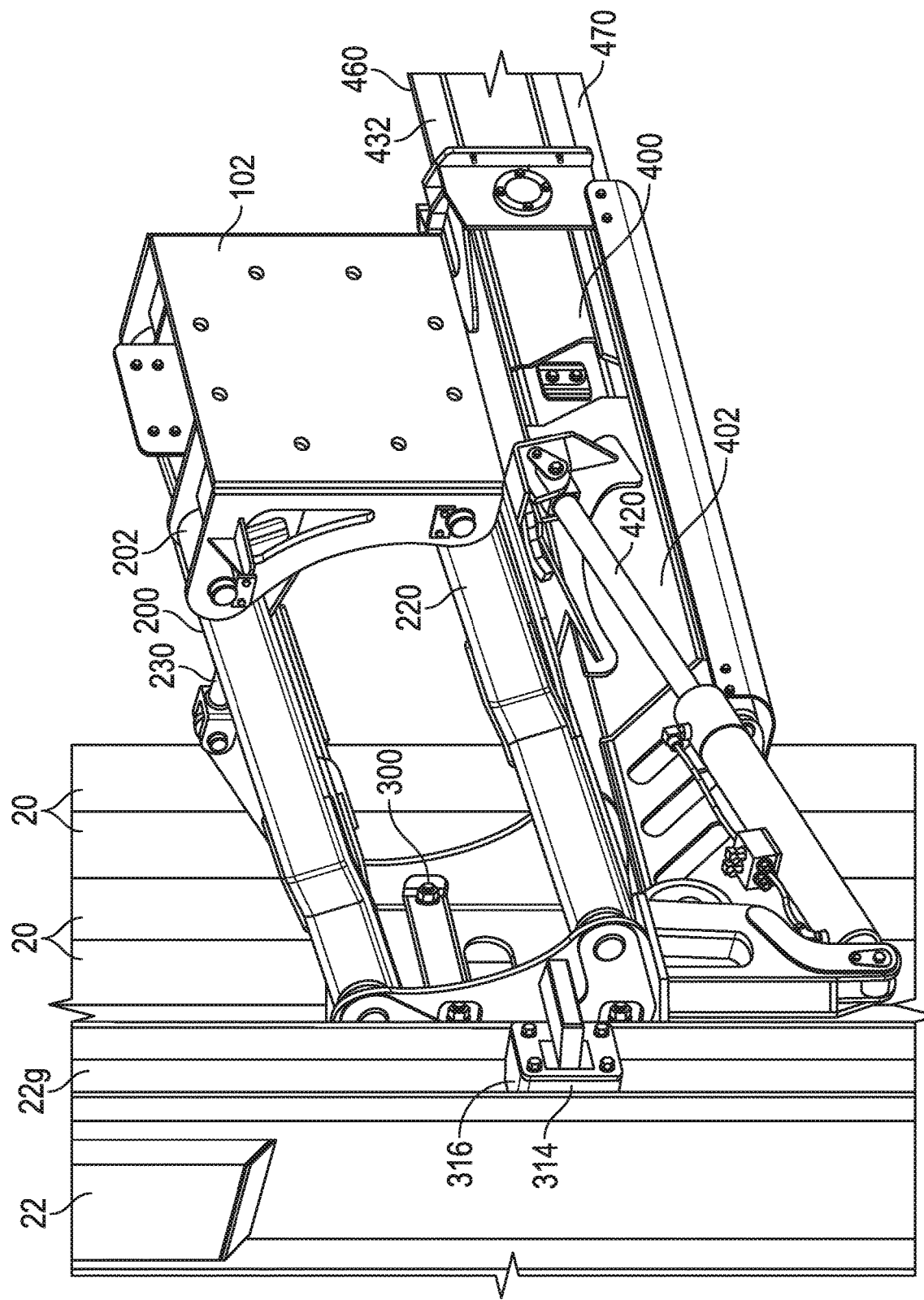
FIG. 18 is a zoomed-in perspective view of a stop assembly of the pipe handler assembly shown in FIG. 16.

FIGS. 17 and 18 illustrate pipe handler assembly 100 of well system 10 in an extended-telescoped position engaging the lower end 20b of a pipe stand 20 being tripped into the wellbore of well system 10. In the extended-telescoped position of pipe handler assembly 100, the upper arm assembly 200 is in the extended position, with stop member 314 (shown in FIG. 18) of connector assembly 300 disposed within and engaging the longitudinally extending groove 22g of torque tube 22. Engagement between stop member 314 and longitudinal groove 22g aids in positioning pipe handler assembly 100 relative wellbore centerline 15 such that a longitudinal axis 25 of pipe stand 20 may align with wellbore centerline 15 once the tripping operation is completed. In the extended-telescoped position, the lower end 20b of pipe stand 20 is disposed in the setback position, either at or near setback area 16, while the upper end 20a is coupled to an elevator of the top drive assembly (not shown) disposed along wellbore centerline 15, thereby positioning the longitudinal axis 25 of pipe stand 20 at an angle relative wellbore centerline 15. In the extended-telescoped position, the lower arm assembly 400 is in both the extended and telescoped positions, with engagement surface 516 of engagement member 510 engaging and guiding the lower end 20b of pipe stand 20. Further, in the extended-telescoped position, an angle $\alpha_1$ is formed between a longitudinal axis 405 of lower arm assembly 400 and the longitudinal axis 25 of pipe stand 20. With angle $\alpha_1$ disposed between the respective axes of lower arm assembly 400 and the pipe stand 20.

Figure 19A:
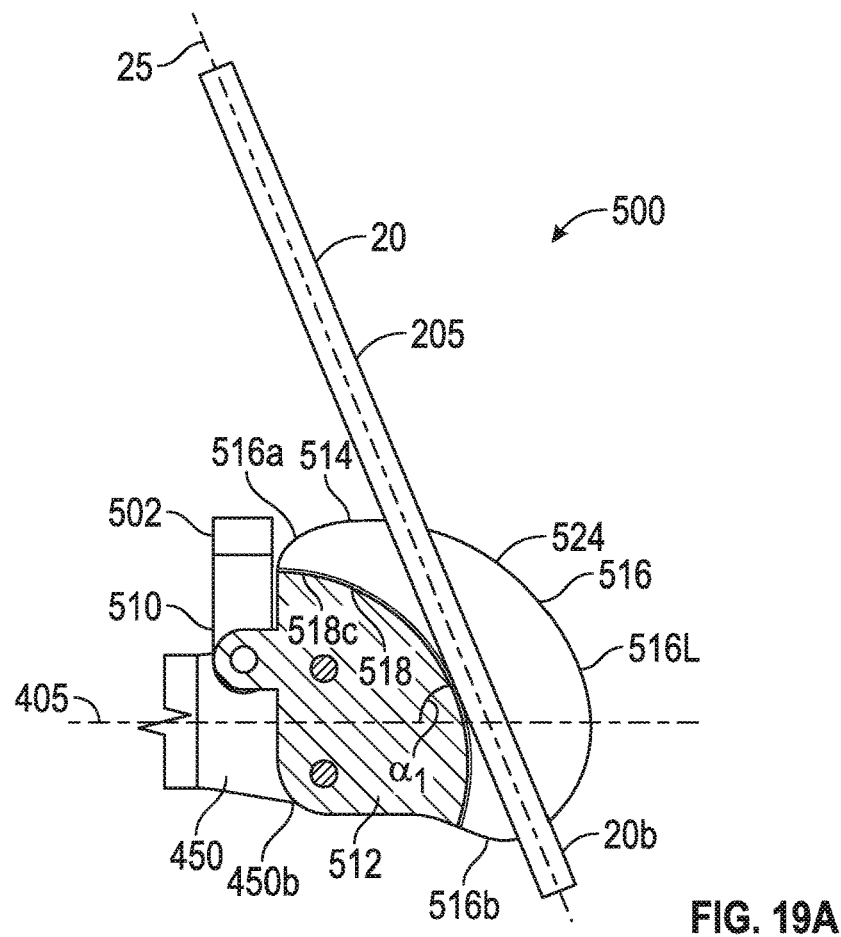
FIG. 19A is a side cross-sectional view of the guide assembly shown in FIG. 15A engaging a tubular member at a first angle.
Figure 19B:
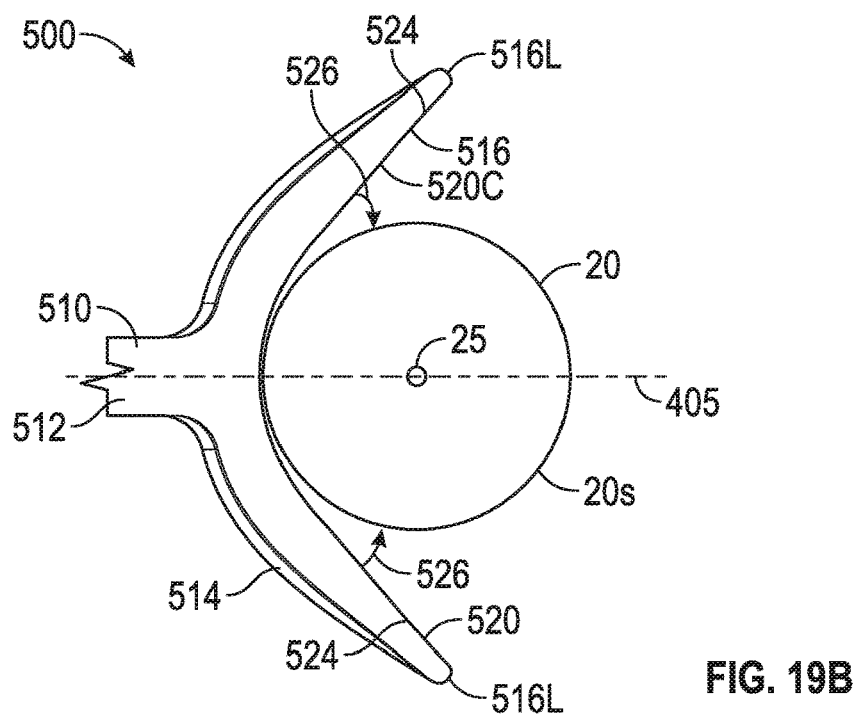
FIG. 19B is a top cross-sectional view of the guide assembly shown in FIG. 15A engaging a tubular member at a first angle.

Referring to FIGS. 19A and 19B, in this embodiment the convex axis 518 of engagement surface 516 produces a convex curved surface 518c on engagement surface 516 extending between upper end 516a and lower end 516b. Described another way, engagement surface 516 includes convex surface 518c when viewed in a cross-sectional plane that is orientated parallel to the longitudinal axis 25 of pipe stand 20 (i.e., the cross-sectional plane does not intersect axis 25), as illustrated in FIG. 19A. Also, the concave axis 520 of engagement surface 516 produces a concave surface 520c on engagement surface 516. Described in another way, engagement surface 516 includes concave surface 520c when viewed in a cross-sectional plane that is orientated perpendicular to longitudinal axis 25 of pipe stand 20 (i.e., the cross-sectional plane intersects axis 25), as illustrated in FIG. 19B.

In the embodiment of FIGS. 19A and 19B, the convex surface 518c is configured to engage and support the tubular member, as the angle (e.g., angle $\alpha_1$) between the axis of the tubular member and the axis of the lower arm assembly 400 during the course of the tripping operation. For example, if the longitudinal axis of the tubular member is orthogonal to the longitudinal axis of the lower arm assembly 400, the tubular member will be engaged by a portion of convex surface 518c proximal lower end 516b of engagement surface 516. As the angle between the longitudinal axis of the tubular member and the longitudinal axis of the lower arm assembly 400 is reduced (i.e., reduced to less than 90°), the tubular member will engage a portion of convex surface 518c distal lower end 516b, moving towards upper end 516a. As shown particularly in FIG. 19A, with angle $\alpha_1$ disposed between longitudinal axis 405 of lower arm assembly 400 and longitudinal axis 25 of pipe stand 20, pipe stand 20 engages a portion of engagement surface 516 distal both upper end 516a and lower end 516b. Also, in this embodiment engagement member 510 engages pipe stand 20 via frictional engagement between engagement surface 516 and an outer surface 20s of pipe stand 20, but otherwise, pipe stand 20 is not fastened or otherwise held, attached, or coupled to guide member 510 and pipe handler assembly 100. Particularly, guide member 510 is free of clamps, fasteners, actuators, grippers, and all other means for connecting pipe stand 20 to the guide member 510. In this manner, guide member 510 is unattached to pipe stand 20 such that the pipe stand 20 is free to slide against the engagement surface 516 when being guided.

As shown in FIG. 19A, the convex surface 518c of guide member 510 allows guide member 510 to frictionally engage and guide pipe stand 20 at varying angles (e.g., angle $\alpha_1$) between the longitudinal axis 25 of pipe stand 20 and the longitudinal axis 405 of lower arm assembly 400. As shown particularly in FIG. 19B, the concave surface 520c (which includes flared ends 524) of guide member 510 biases 526 pipe stand 20 into engagement with guide member 510. Particularly, concave surface 520c biases 526 pipe stand 20 such that longitudinal axis 25 of pipe stand 20 intersects longitudinal axis 405 of lower arm assembly 400 as the pipe stand 20 is in motion. In this manner, the biasing provided by concave surface 520c and flared ends 524 restricts pipe stand 20 from slipping out of frictional engagement with engagement surface 516 of guide member 510 without necessitating the use of couplers, fasteners, or other means for securing pipe stand 20 to guide member 510.

Figure 20:
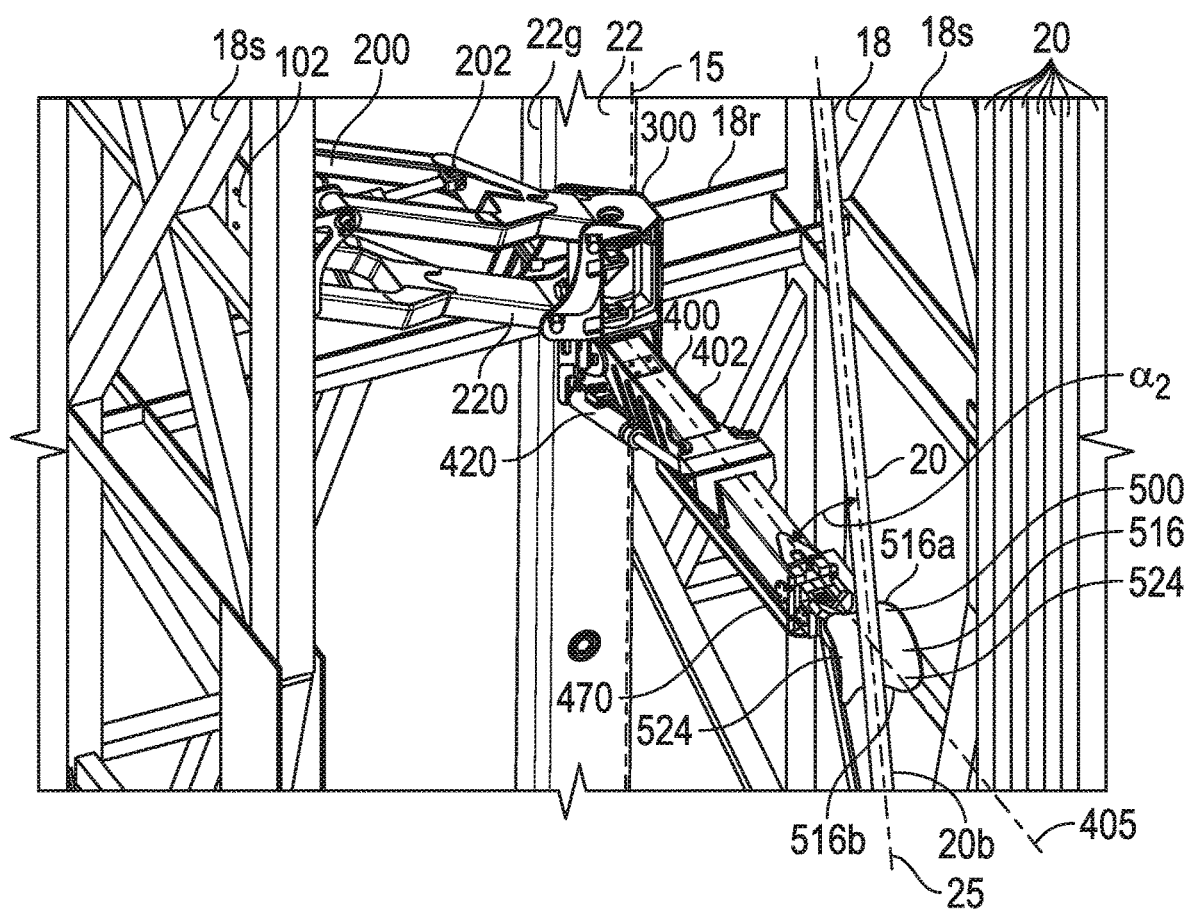
FIG. 20 is a zoomed-in perspective view of the well system shown in FIG. 1 with the pipe handler assembly in an extended-distended position.

Referring to FIG. 20, pipe handler assembly 100 is shown in an extended-distended position with upper arm assembly 200 in the extended position, and lower arm assembly 400 in an extended and distended position. Particularly, lower arm assembly 400 is rotatably extended by actuators 420 while distended with telescoping actuator 470 disposed in a contracted position. In this position, the lower end 20b is guided by guiding assembly 500 from the setback position at setback area 16 towards the wellbore centerline 15 such that the angle between the wellbore centerline 15 and the longitudinal axis 25 of pipe stand 20 is reduced. Further, an angle $\alpha_2$ is formed between longitudinal axis 405 of lower arm assembly 400 and longitudinal axis 25 of pipe stand 20, where angle $\alpha_2$ is greater than angle $\alpha_1$ shown in FIGS. 17 and 18. Due to the increased angle $\alpha_2$ between the respective longitudinal axes of lower arm assembly 400 and pipe stand 20, the pipe stand 20 engages a portion of engagement surface 516 of engagement member 510 proximal lower end 516.

Figure 21:
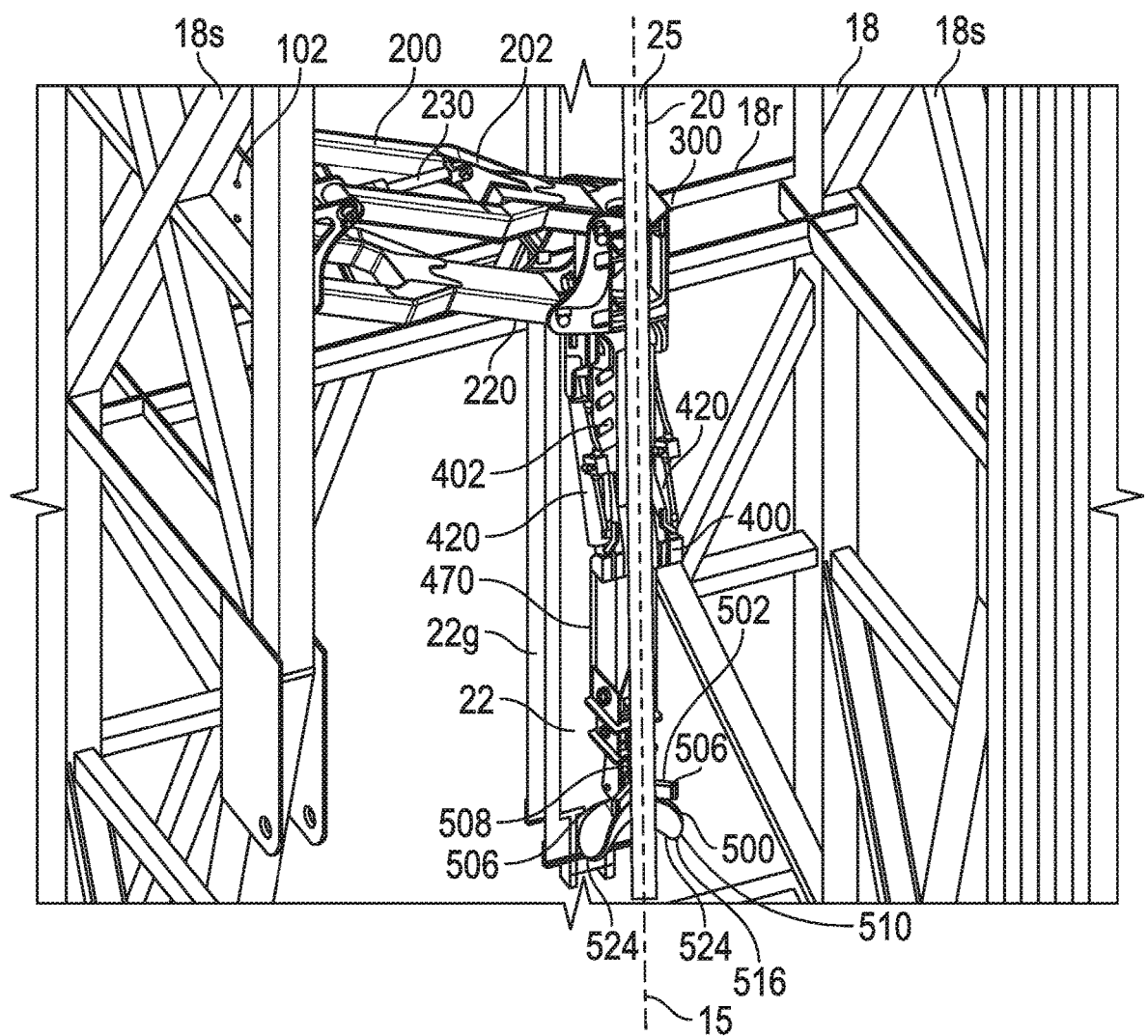
FIG. 21 is a zoomed-in perspective view of the well system shown in FIG. 1 with the pipe handler assembly in an extended-retracted-distended position.

Referring to FIG. 21, pipe handler assembly 100 of well system 10 is shown in an extended-retracted-distended position with upper arm assembly 200 in the extended position, and lower arm assembly 400 in a retracted and distended position. Particularly, in the extended-retracted-distended position, lower arm assembly 400 is both rotatably retracted by actuators 420 while distended with telescoping actuator 470 disposed in a contracted position. In this position, the longitudinal axis 25 of pipe stand 20 is disposed coaxially with wellbore centerline 15 of well system 10. Thus, in this position, pipe stand 20 may be rotated (e.g., by the top drive assembly or an iron roughneck) to threadably couple the lower end 20b of pipe stand 20 with an upper end 20a of a pipe stand 20 (not shown) extending upward through hole 14 in rig floor 12. Further, in this position lower end 20b of pipe stand 20 is disposed adjacent magnet 502, with magnet 502 aiding in the positioning of pipe stand 20 such that longitudinal axis 25 of pipe stand 20 is disposed coaxial with wellbore centerline 15. Particularly, outer elongate portions 506 of magnet 502 flank each side of pipe stand 20, while central elongate portion 508 is disposed directly adjacent pipe stand 20. In this arrangement, outer elongate portions 506 and central elongate portion 508 act jointly to produce a centralizing magnetic force on pipe stand 20 to aid in centralizing longitudinal axis 25 of pipe stand 20 respective wellbore centerline 15. The operation of pipe handler assembly 100 as it guides a tubular member into or out of a wellbore during a tripping operation may be remotely operated manually via rig personnel or automatically via a control system of well system 10. Although pipe handler assembly 100 is described above in the context of guiding a tubular member 20 when tripping into a wellbore, in other embodiments pipe handler assembly 100 may also be utilized during drilling operations. Moreover, pipe handler assembly may also be utilized for guiding tubular members 20 as the tubular member 20 is displaced by a powered catwalk of a well system.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A pipe handler for handling tubular members of a well system, comprising:
   a mounting member for mounting the pipe handler to a structure of the well system;
   a first arm having a first end coupled to a structure of the well system, and a second end, wherein the first arm is configured to pivot relative to the mounting member about a first axis;
   a second arm having a first end and a second end;
   a connector coupled to the second end of the first arm and the first end of the second arm, and wherein the connector is configured to rotate the second arm about a second axis; and
   a guide member coupled to the second end of the second arm and comprising an engagement surface for guiding a tubular member between a setback position offset from a wellbore centerline of the well system and a wellbore position aligned with the wellbore centerline, and wherein the guide member is unattached to the tubular member such that the tubular member is free to slide against the engagement surface when being guided by the guide member between the setback position and the wellbore position;
   wherein the second arm is configured to pivot relative to the connector about a third axis.

2. The pipe handler of claim 1, wherein the engagement surface of the guide member comprises a concave axis, and a convex axis intersecting the concave axis.

3. The pipe handler of claim 1, wherein the engagement surface of the guide member comprises outwardly flared ends for maintaining physical engagement between the engagement member and the tubular member.

4. The pipe handler of claim 1, further comprising a magnet coupled to the guide member to exert a magnetic force on the tubular member.

5. The pipe handler of claim 1, wherein the second arm comprises a telescoping assembly configured to extend a length of the second arm.

6. The pipe handler of claim 1, wherein the second axis is disposed orthogonal to the third axis.

7. A pipe handler for handling tubular members of a well system, comprising:
   a first arm having a first end coupled to a structure of the well system, and a second end;
   a second arm having a first end and a second end;
   a connector coupled to the second end of the first arm and the first end of the second arm, the connector being configured to permit the second arm to pivot relative to the first arm; and
   a guide member coupled to the second end of the second arm for guiding a tubular member, wherein the guide member comprises an engagement surface having a concave axis, and a convex axis intersecting the concave axis.

8. The pipe handler of claim 7, wherein the engagement surface of the guide member comprises outwardly flared ends for biasing the tubular member to remain in physical engagement with the guide member as the tubular member is in motion.

9. The pipe handler of claim 7, further comprising a magnet coupled to the guide member to exert a magnetic force on the tubular member.

10. The pipe handler of claim 7, wherein the guide member is unattached to the tubular member such that the tubular member is free to slide against the engagement surface when being guided by the guide member between a setback position offset from a wellbore centerline of the well system and a wellbore position aligned with the wellbore centerline.

11. The pipe handler of claim 7, wherein the second arm comprises a telescoping assembly configured to extend a length of the second arm.

12. The pipe handler of claim 7, wherein:
the first arm is configured to pivot about a first axis relative to the mounting member;
the connector is configured to rotate the second arm about a second axis; and
the second arm is configured to pivot about a third axis relative to the connector.

13. The pipe handler of claim 12, wherein the second axis is disposed orthogonal to the third axis.

14. A well system, comprising:
a rig having a rig floor and a structure extending from the rig floor; and
a pipe handler for handling tubular members of a well system, comprising:
a first arm having a first end coupled to the structure, and a second end, wherein the first arm is configured to pivot relative to the structure about a first axis;
a second arm having a first end and a second end;
a connector coupled to the second end of the first arm and the first end of the second arm, and wherein the connector is configured to rotate the second arm about a second axis; and
a guide member coupled to the second end of the second arm and comprising an engagement surface for guiding a tubular member between a setback position offset from a wellbore centerline of the well system and a wellbore position aligned with the wellbore centerline, and wherein the guide member is unattached to the tubular member such that the tubular member is free to slide against the engagement surface when being guided by the guide member between the setback position and the wellbore position;
wherein the second arm comprises a telescoping assembly configured to extend a length of the second arm.

15. The well system of claim 14, wherein the engagement surface of the guide member comprises a concave axis, and a convex axis intersecting the concave axis.

16. The well system of claim 14, wherein the engagement surface of the guide member comprises outwardly flared ends for biasing the tubular member to remain in physical engagement with the guide member as the tubular member is in motion.

17. The well system of claim 14, further comprising a magnet coupled to the guide member to exert a magnetic force on the tubular member.

18. The well system of claim 14, further comprising a mounting member coupling the first arm to the structure and wherein:
the first arm is configured to pivot relative to the mounting member about a first axis;
the connector is configured to rotate the second arm about a second axis; and
the second arm is configured to pivot relative to the connector about a third axis.

* * * * *